US010946640B2

(12) United States Patent
Katoh et al.

(10) Patent No.: US 10,946,640 B2
(45) Date of Patent: Mar. 16, 2021

(54) TRANSFER APPARATUS, LIQUID EJECTION APPARATUS, READING APPARATUS, IMAGE FORMING APPARATUS, CONTROL METHOD OF THE TRANSFER APPARATUS

(71) Applicants: Taiichi Katoh, Kanagawa (JP); Tomoaki Hayashi, Tokyo (JP)

(72) Inventors: Taiichi Katoh, Kanagawa (JP); Tomoaki Hayashi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/614,942

(22) PCT Filed: Jun. 12, 2018

(86) PCT No.: PCT/JP2018/022478
§ 371 (c)(1),
(2) Date: Nov. 19, 2019

(87) PCT Pub. No.: WO2018/230576
PCT Pub. Date: Dec. 20, 2018

(65) Prior Publication Data
US 2020/0171816 A1 Jun. 4, 2020

(30) Foreign Application Priority Data
Jun. 14, 2017 (JP) .............................. JP2017-117301
Jun. 8, 2018 (JP) .............................. JP2018-110541

(51) Int. Cl.
*B41J 2/045* (2006.01)
*B41J 2/21* (2006.01)
(Continued)

(52) U.S. Cl.
CPC ....... *B41J 2/04505* (2013.01); *B41J 2/04586* (2013.01); *B41J 2/2146* (2013.01);
(Continued)

(58) Field of Classification Search
CPC .. B41J 2/04505; B41J 2/04586; B41J 2/2146; B41J 11/0095; B41J 15/04; B41J 25/001;
(Continued)

(56) References Cited

U.S. PATENT DOCUMENTS 9,028,027 B2  5/2015  Bell et al.
10,207,494 B2 * 2/2019  Nagasu ................ B41J 2/04505
(Continued)

FOREIGN PATENT DOCUMENTS

JP  2015-013476  1/2015
JP  2017-119428  7/2017

OTHER PUBLICATIONS

International Search Report dated Sep. 17, 2018 in PCT/JP2018/022478.

*Primary Examiner* — Anh T Vo
(74) *Attorney, Agent, or Firm* — IPUSA, PLLC

(57) ABSTRACT

A transfer apparatus includes a head unit (210C, 210K) to process an object (W) transferred in a transfer direction, a first support member disposed upstream in the transfer direction with respect to a process position to support the object, a second support member disposed downstream in the transfer direction of the process position to support the object, a surface detector between the first and second support members to detect first surface information of the object, an upstream surface detector disposed upstream in the transfer direction with respect to the surface detector to detect second surface information of the object, an edge detector disposed closer to the upstream surface detector than the surface detector in the transfer direction to detect an edge of the object, and a controller to move the head unit based on detection results of the surface detector and the upstream surface detector and a detection result of the edge detector.

17 Claims, 27 Drawing Sheets

(51) Int. Cl.
*B41J 11/00* (2006.01)
*H04N 1/04* (2006.01)
*B41J 25/00* (2006.01)
*B41J 15/04* (2006.01)
*B41J 2/01* (2006.01)

(52) U.S. Cl.
CPC ........... *B41J 11/0095* (2013.01); *B41J 15/04* (2013.01); *B41J 25/001* (2013.01); *H04N 1/04* (2013.01); *B41J 2002/012* (2013.01); *B41J 2025/008* (2013.01)

(58) Field of Classification Search
CPC .. B41J 2002/012; B41J 2025/008; H04N 1/04
See application file for complete search history.

(56) References Cited

U.S. PATENT DOCUMENTS

| | | | |
|---|---|---|---|
| 2008/0310891 A1* | 12/2008 | Mochizuki | G03G 15/1615 399/302 |
| 2012/0008995 A1* | 1/2012 | Shigemura | G03G 15/0189 399/301 |
| 2013/0049296 A1* | 2/2013 | Takai | B65H 5/023 271/227 |
| 2016/0121602 A1* | 5/2016 | Nagasu | B41J 2/2146 347/14 |
| 2017/0106647 A1 | 4/2017 | Inoue | |
| 2017/0165960 A1 | 6/2017 | Sunaoshi et al. | |
| 2017/0165961 A1 | 6/2017 | Hayashi et al. | |
| 2017/0266954 A1 | 9/2017 | Nagasu et al. | |
| 2017/0266965 A1 | 9/2017 | Gohda et al. | |
| 2017/0348969 A1 | 12/2017 | Chiba | |
| 2017/0355205 A1 | 12/2017 | Tobita et al. | |
| 2018/0022088 A1 | 1/2018 | Bando et al. | |
| 2018/0270366 A1 | 9/2018 | Sunaoshi et al. | |
| 2018/0272694 A1 | 9/2018 | Gohda et al. | |
| 2018/0272770 A1 | 9/2018 | Tobita | |

* cited by examiner

[Fig. 1]
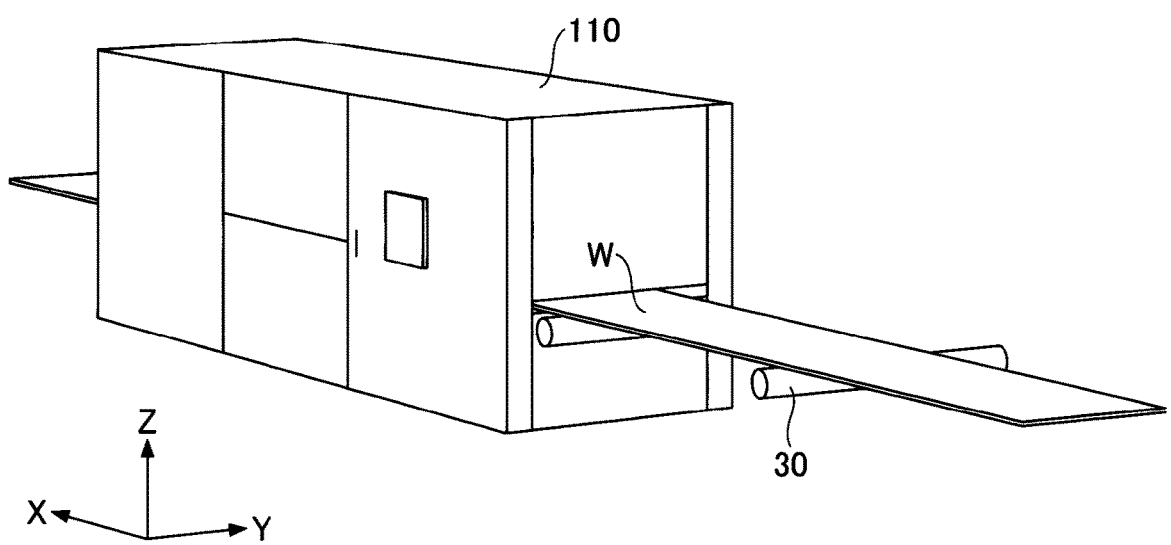

[Fig. 2]
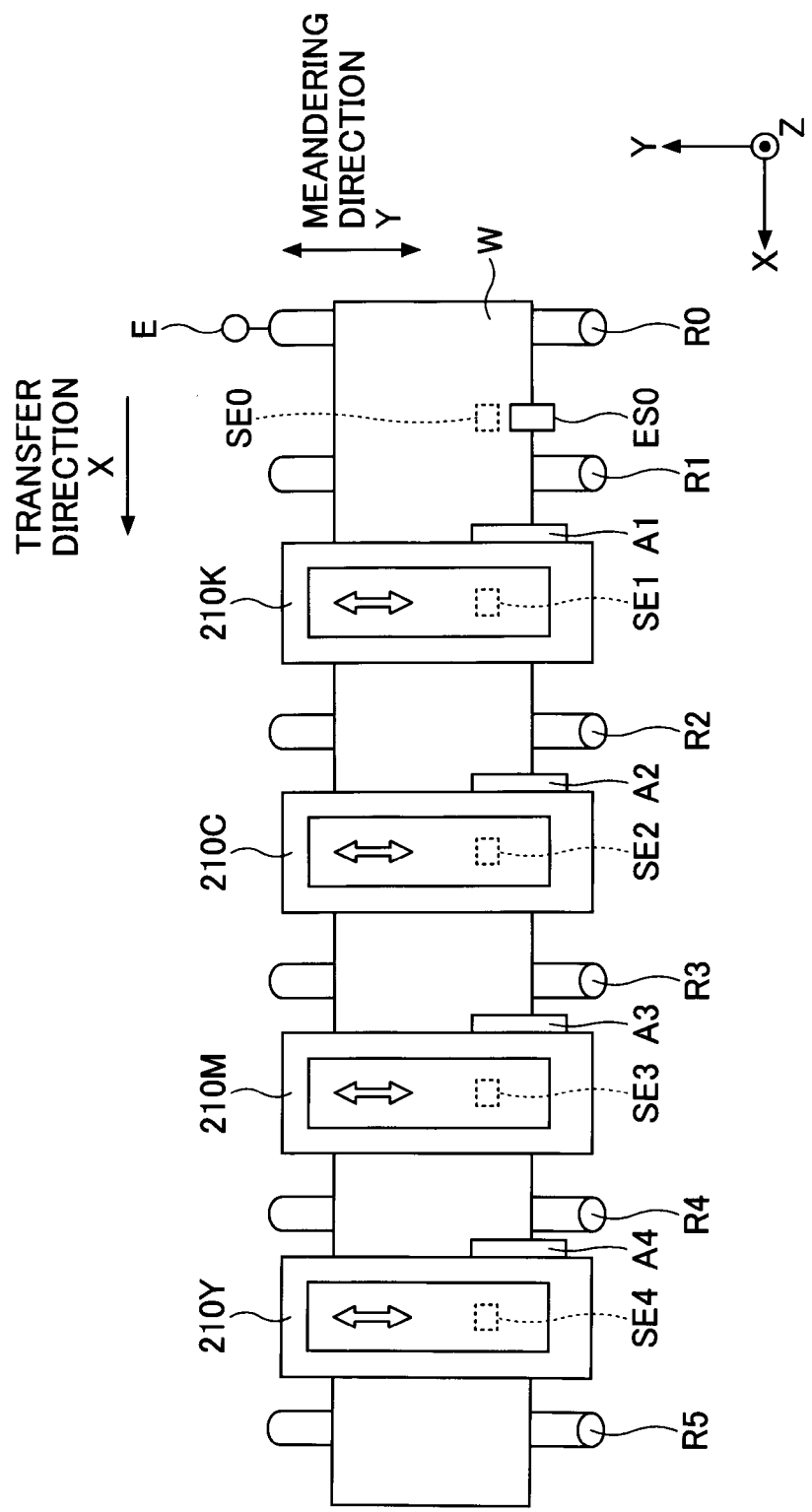

[Fig. 3]
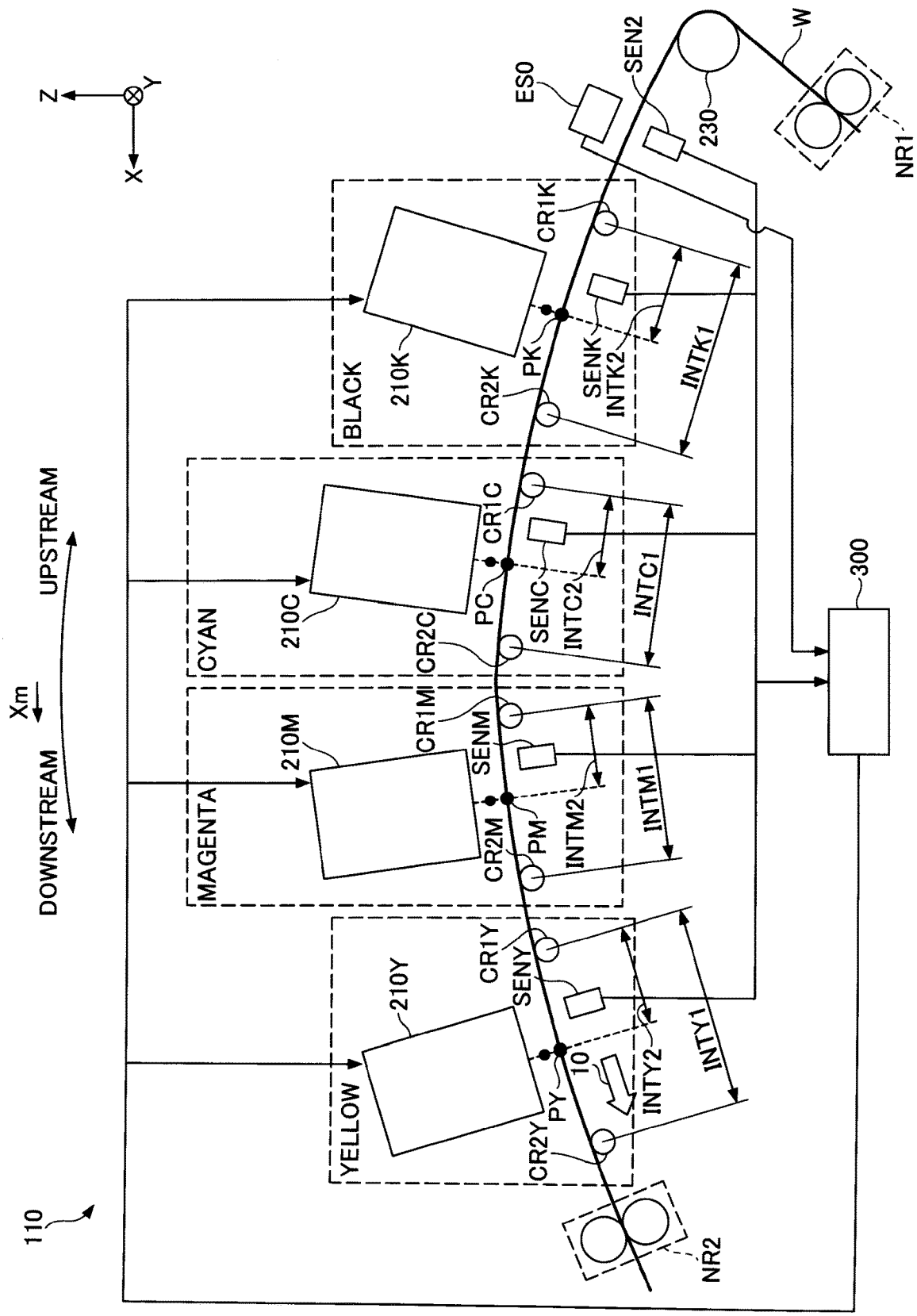

[Fig. 4A]
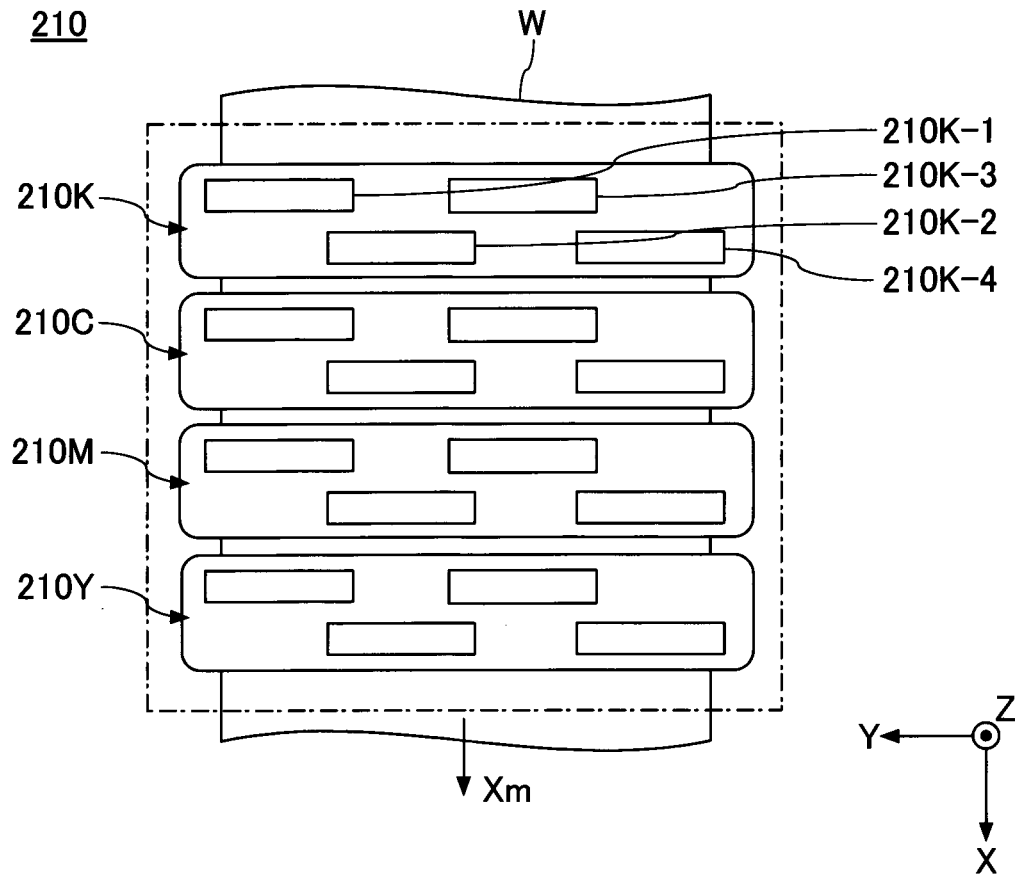
[Fig. 4B]
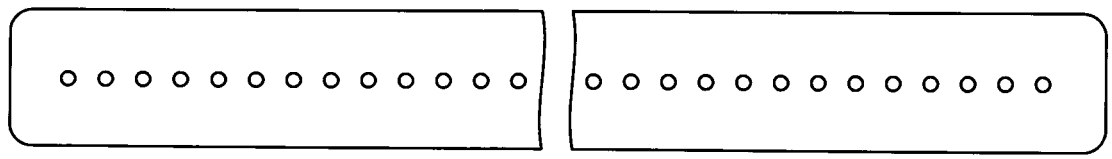
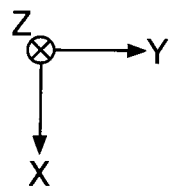

[Fig. 5]
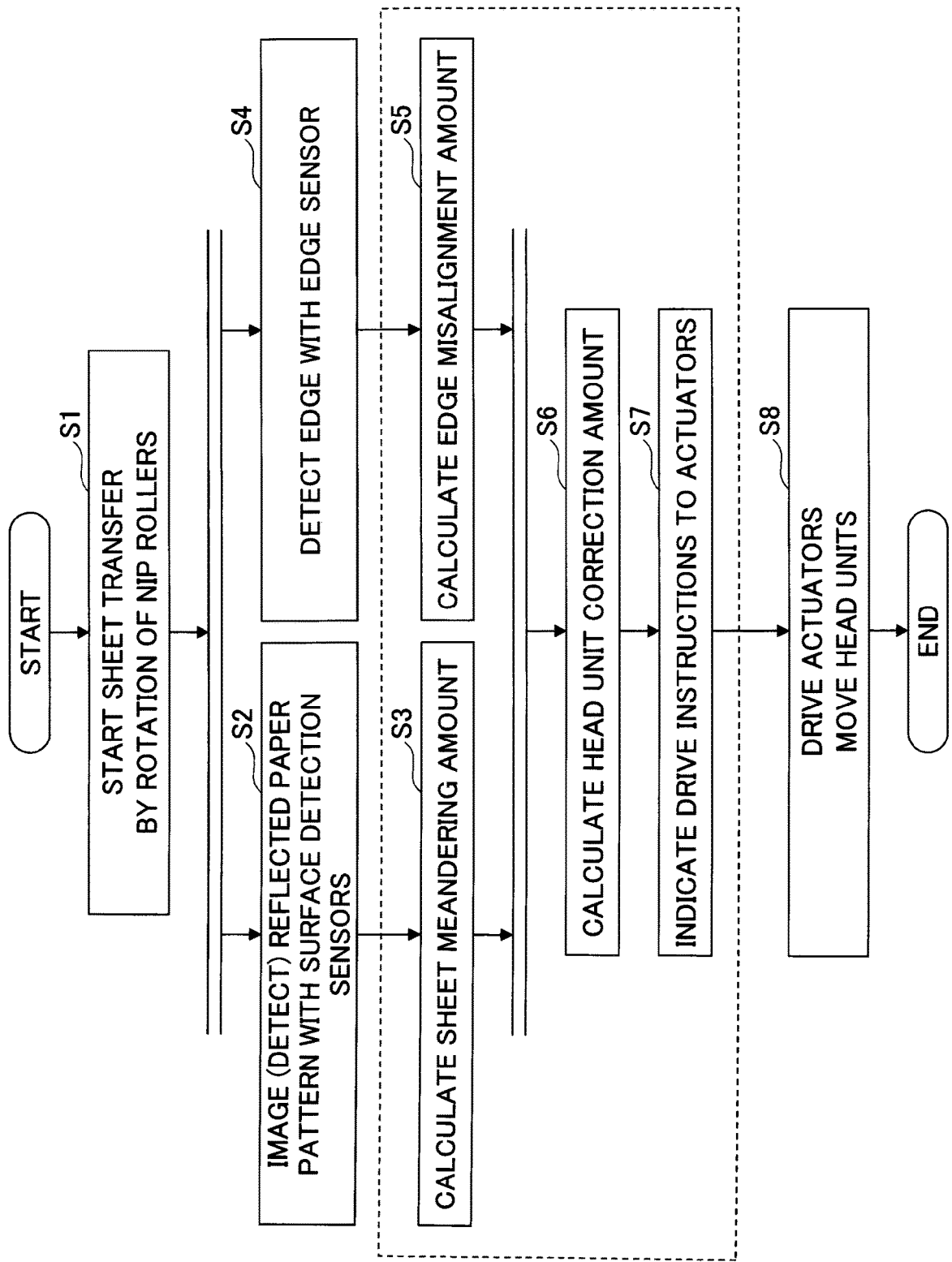

[Fig. 6]
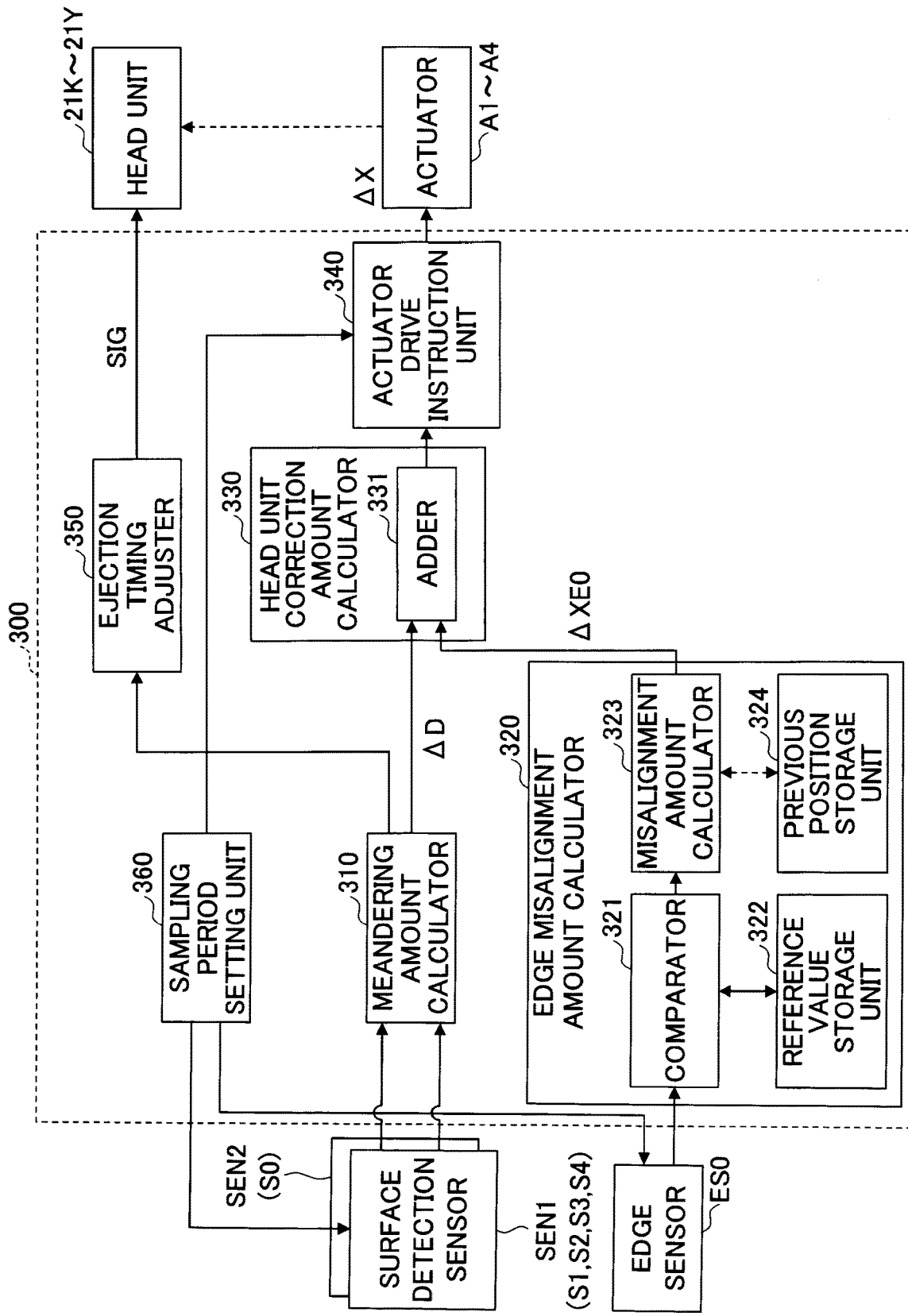

[Fig. 7]
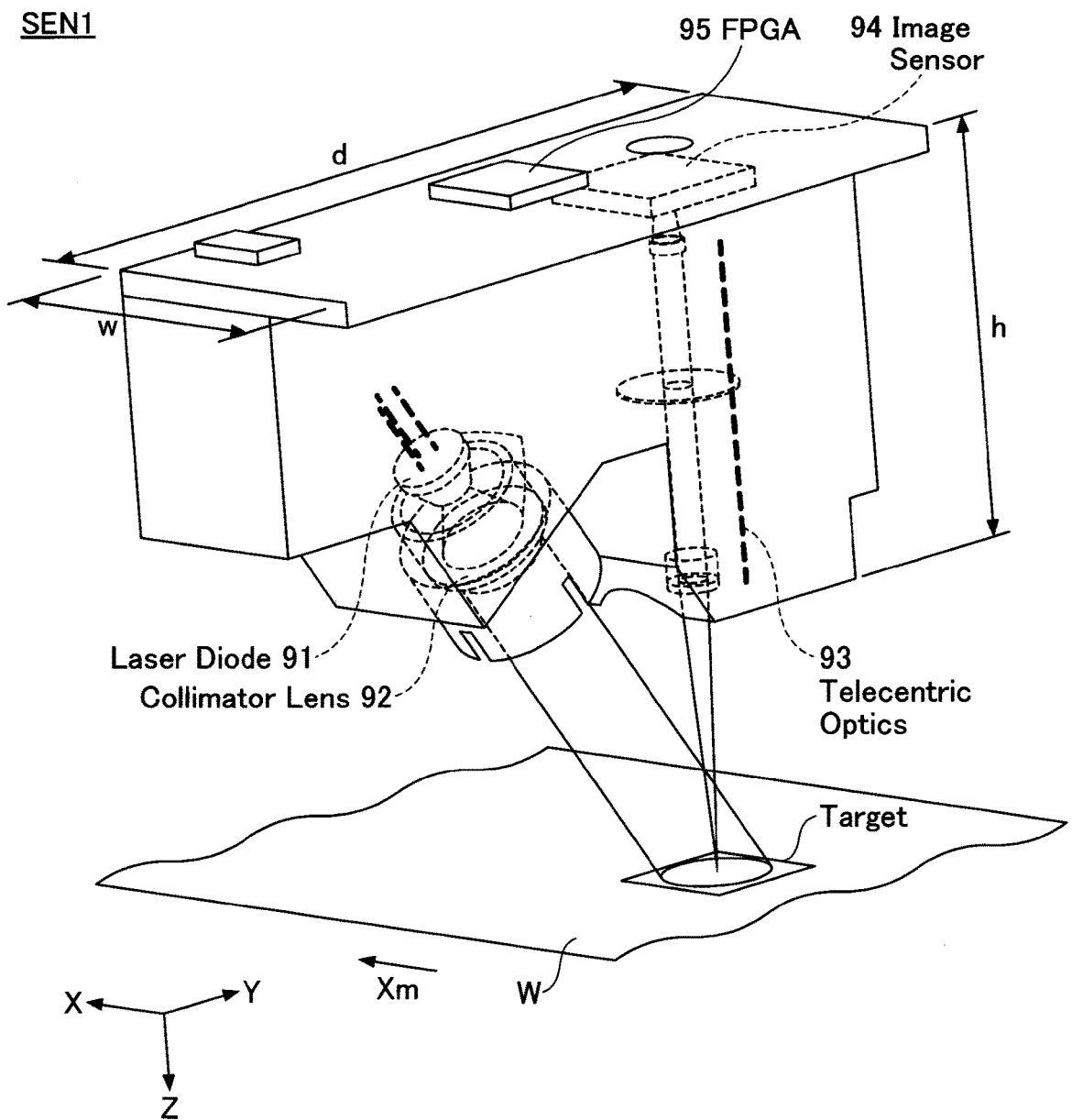

[Fig. 8]
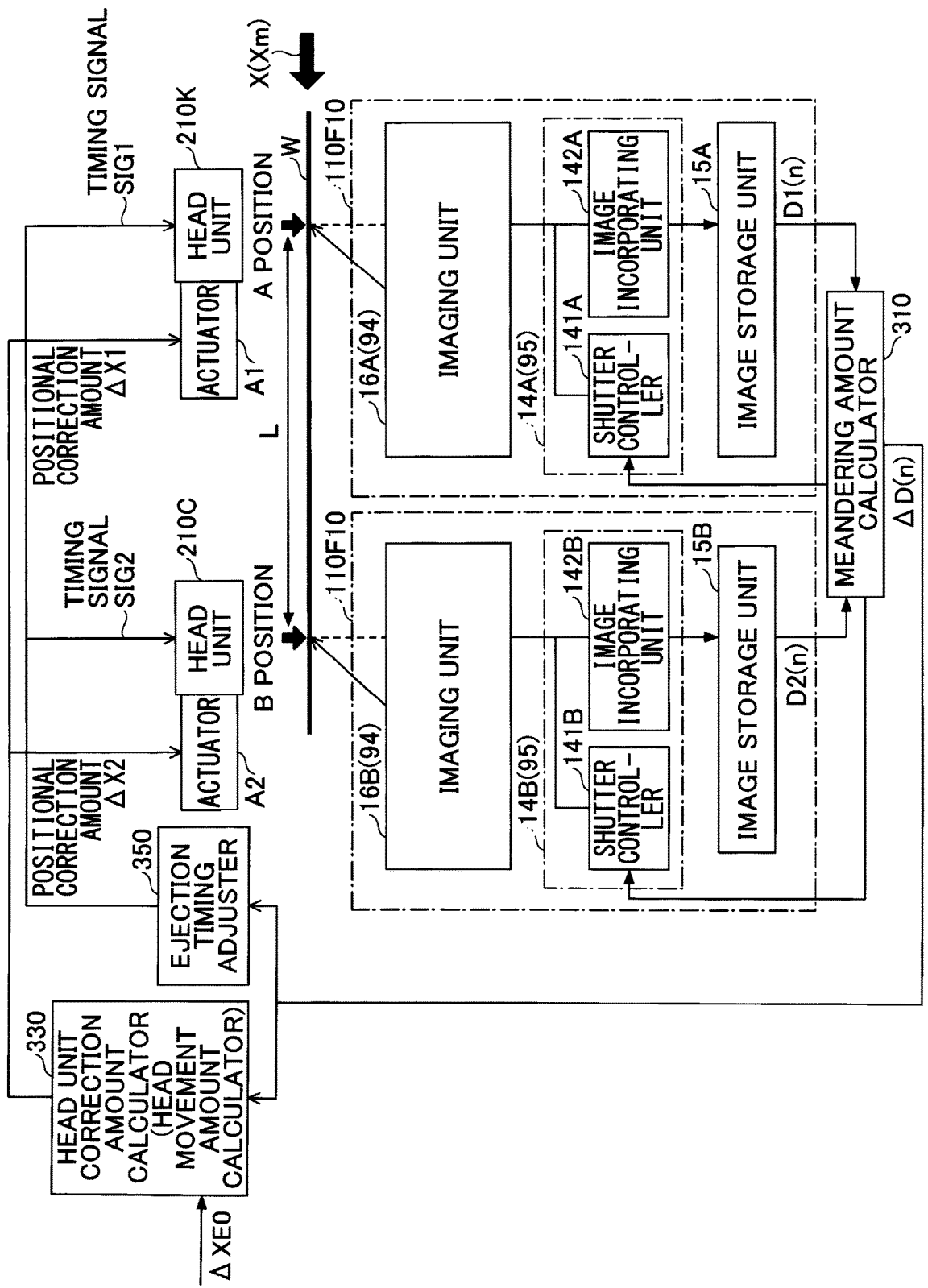

[Fig. 9]
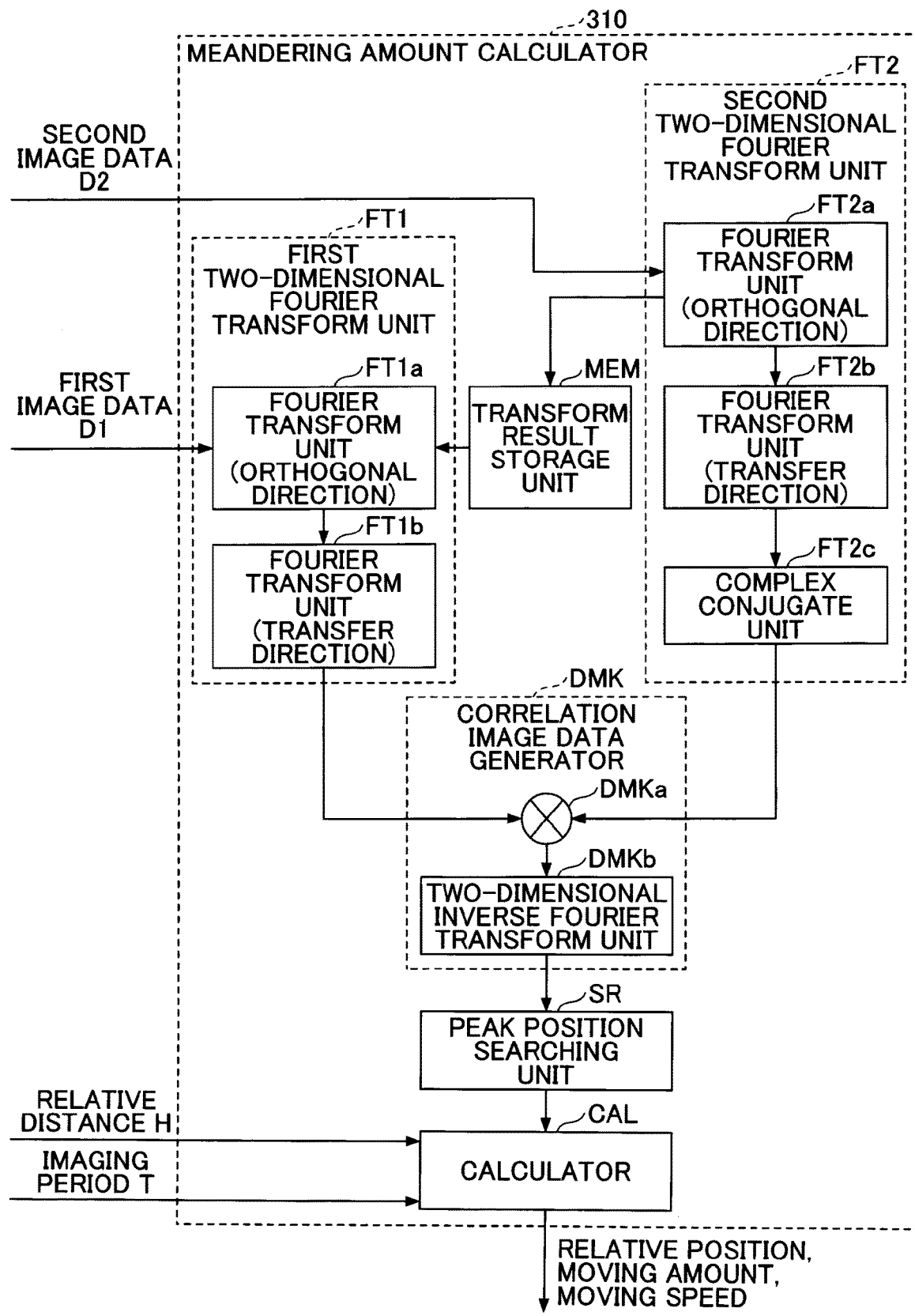

[Fig. 10]
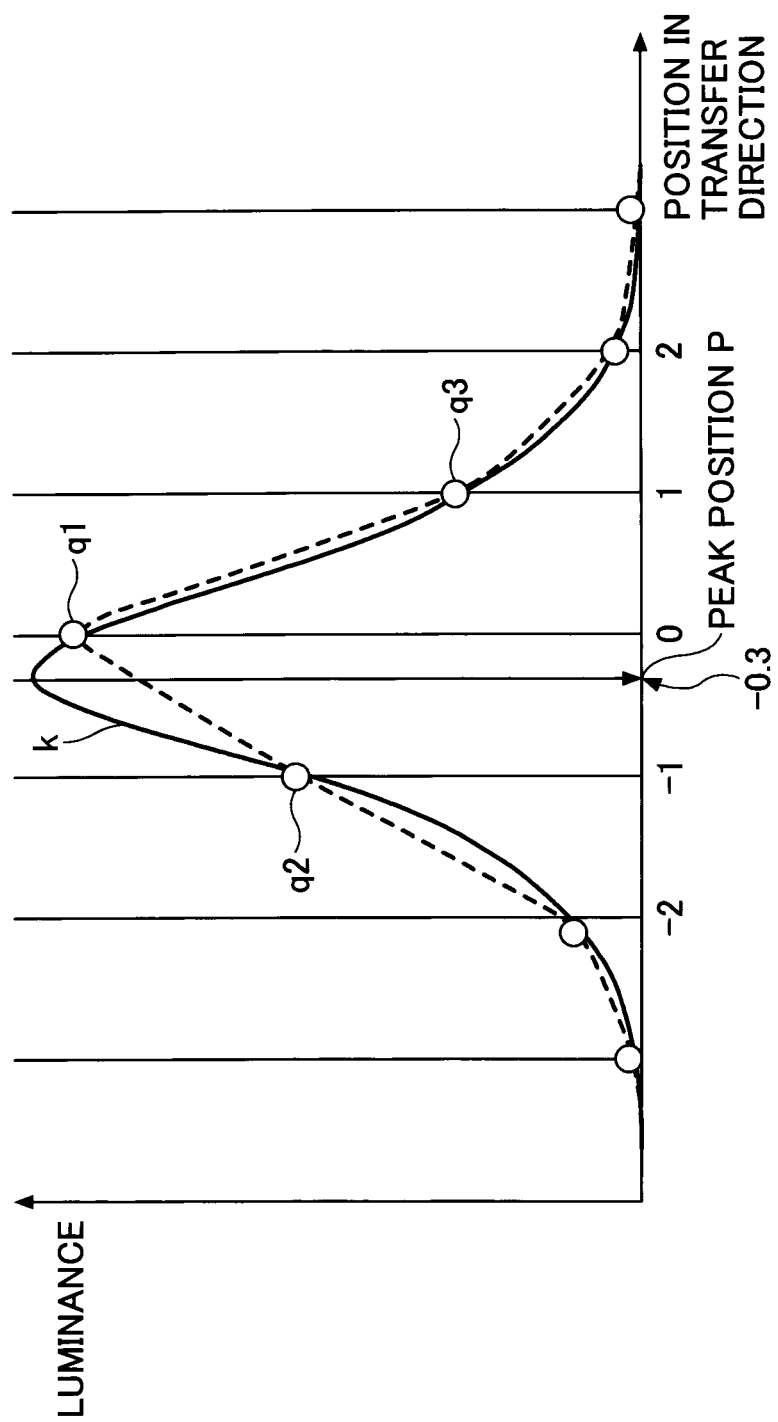

[Fig. 11]
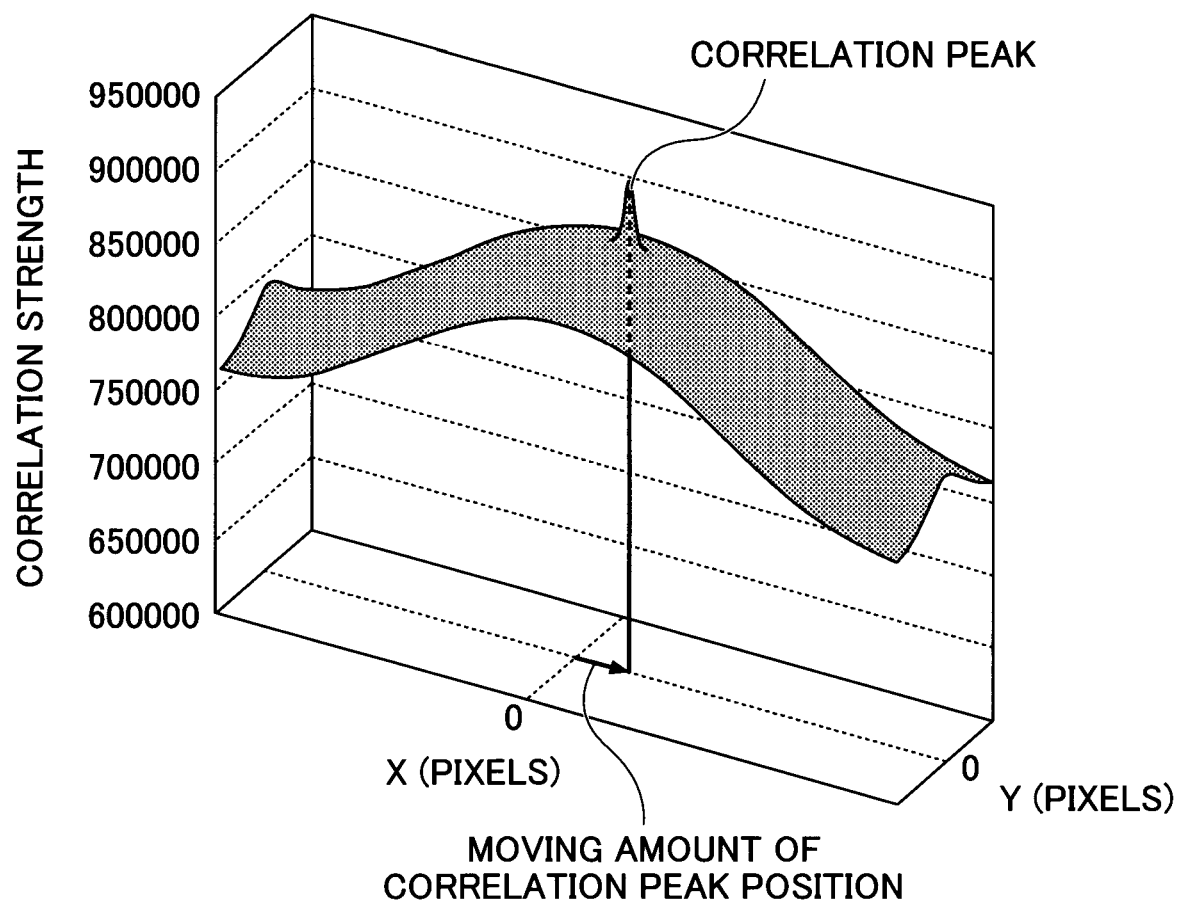

[Fig. 12]
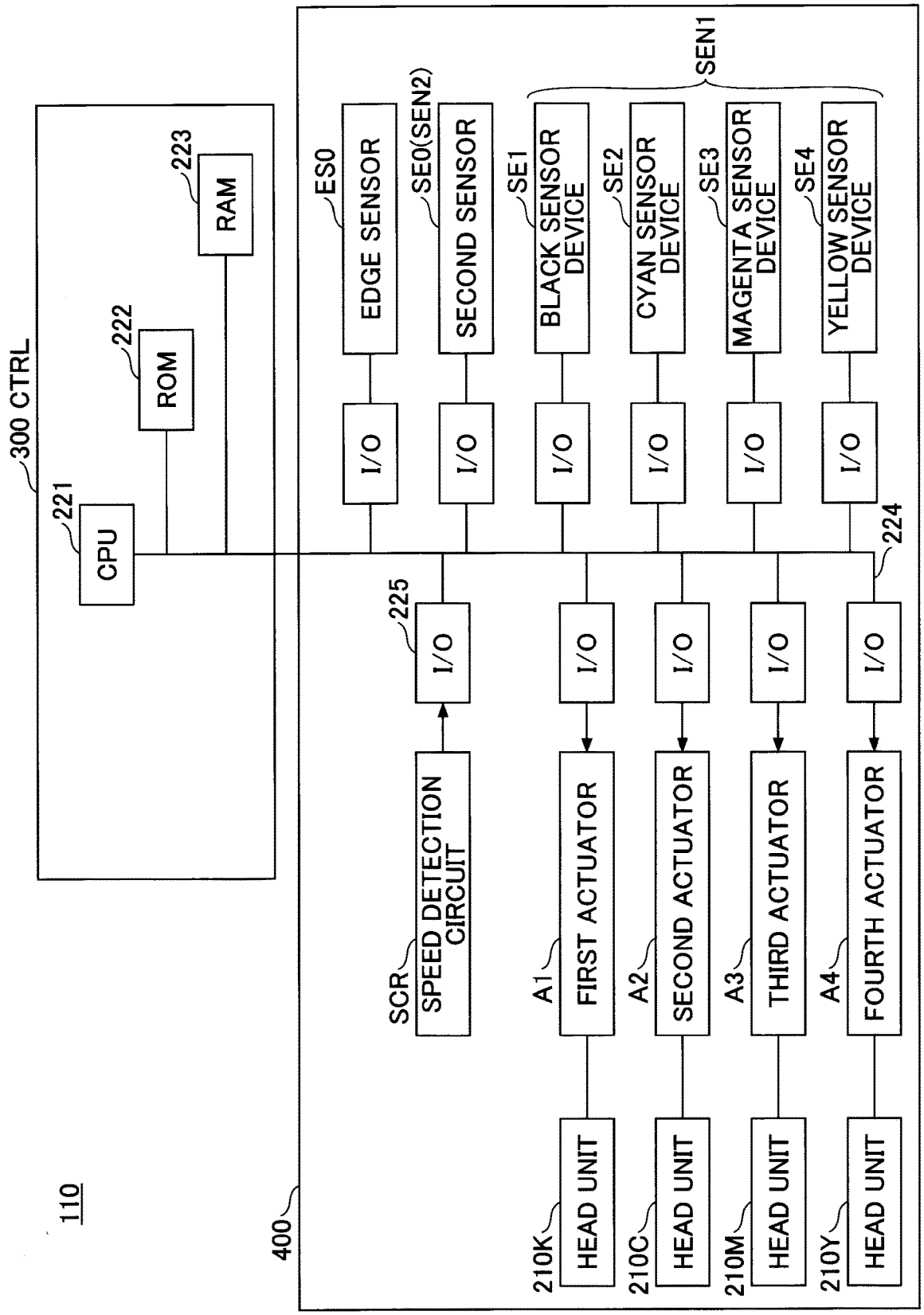

[Fig. 13]
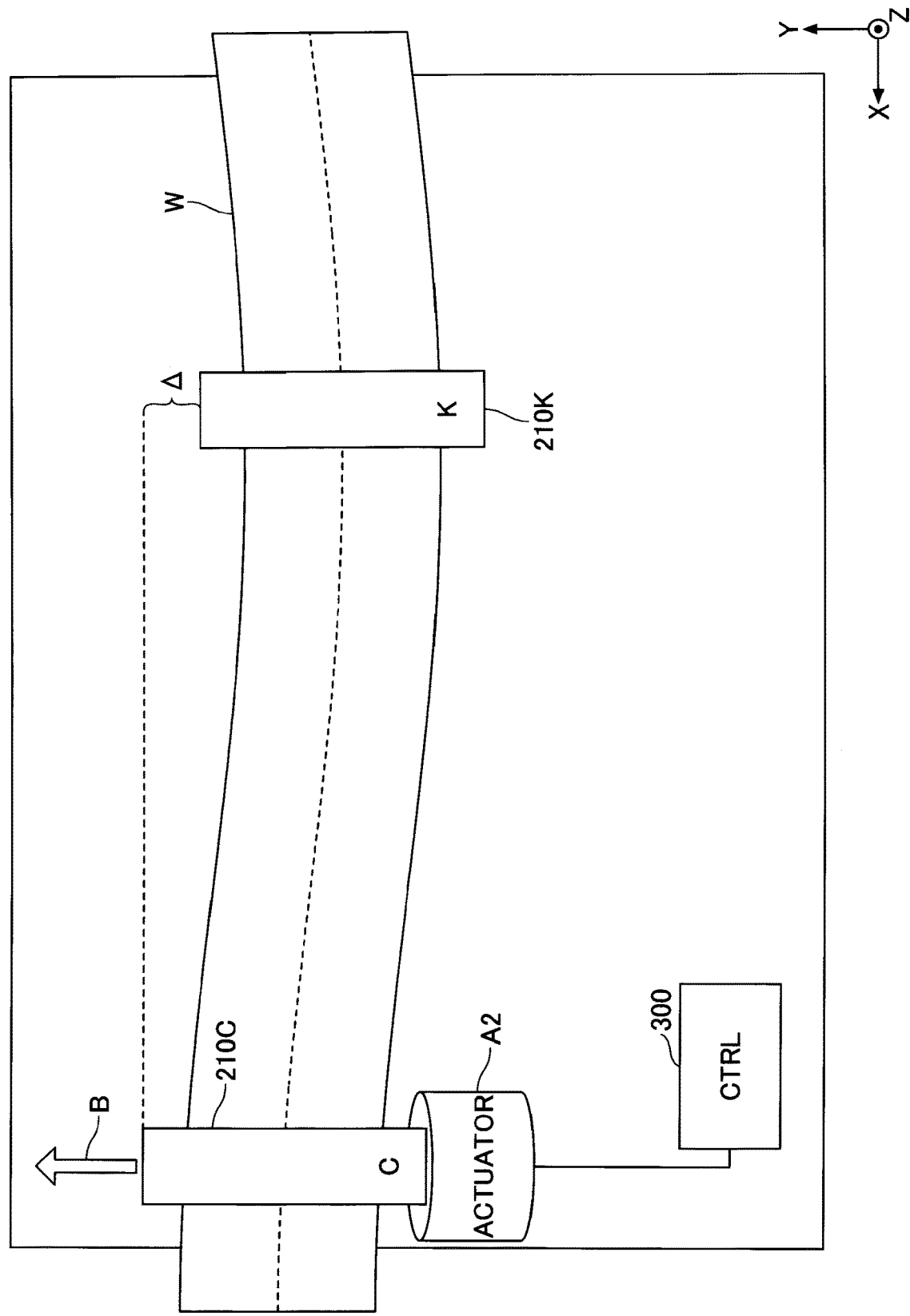

[Fig. 14]
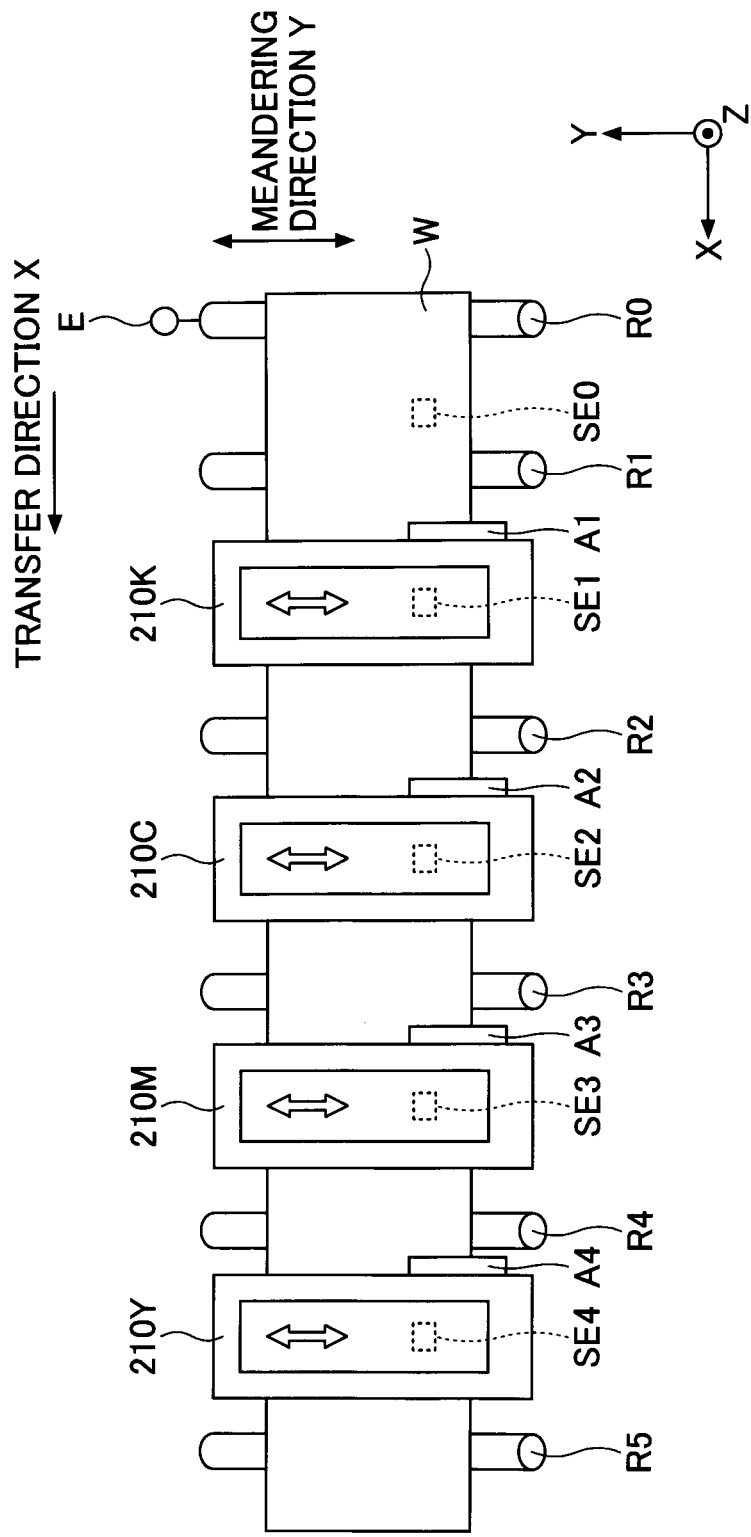

[Fig. 15]
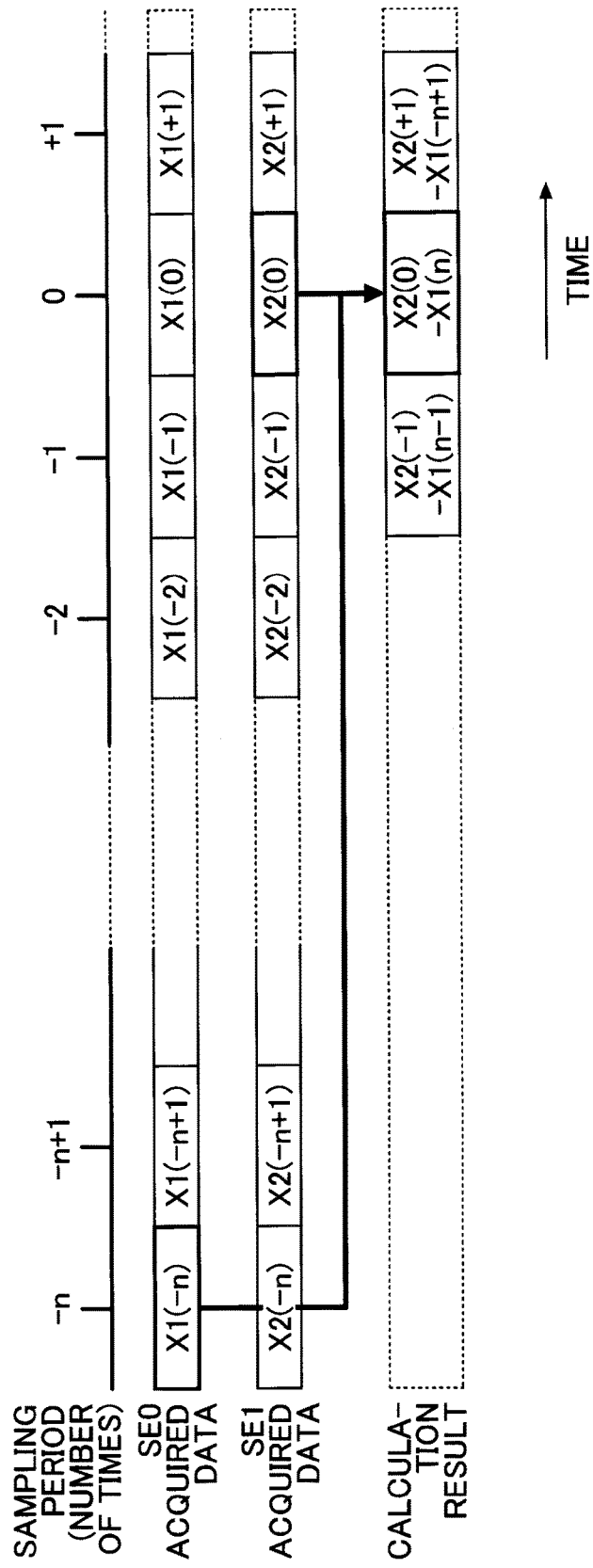

[Fig. 16]
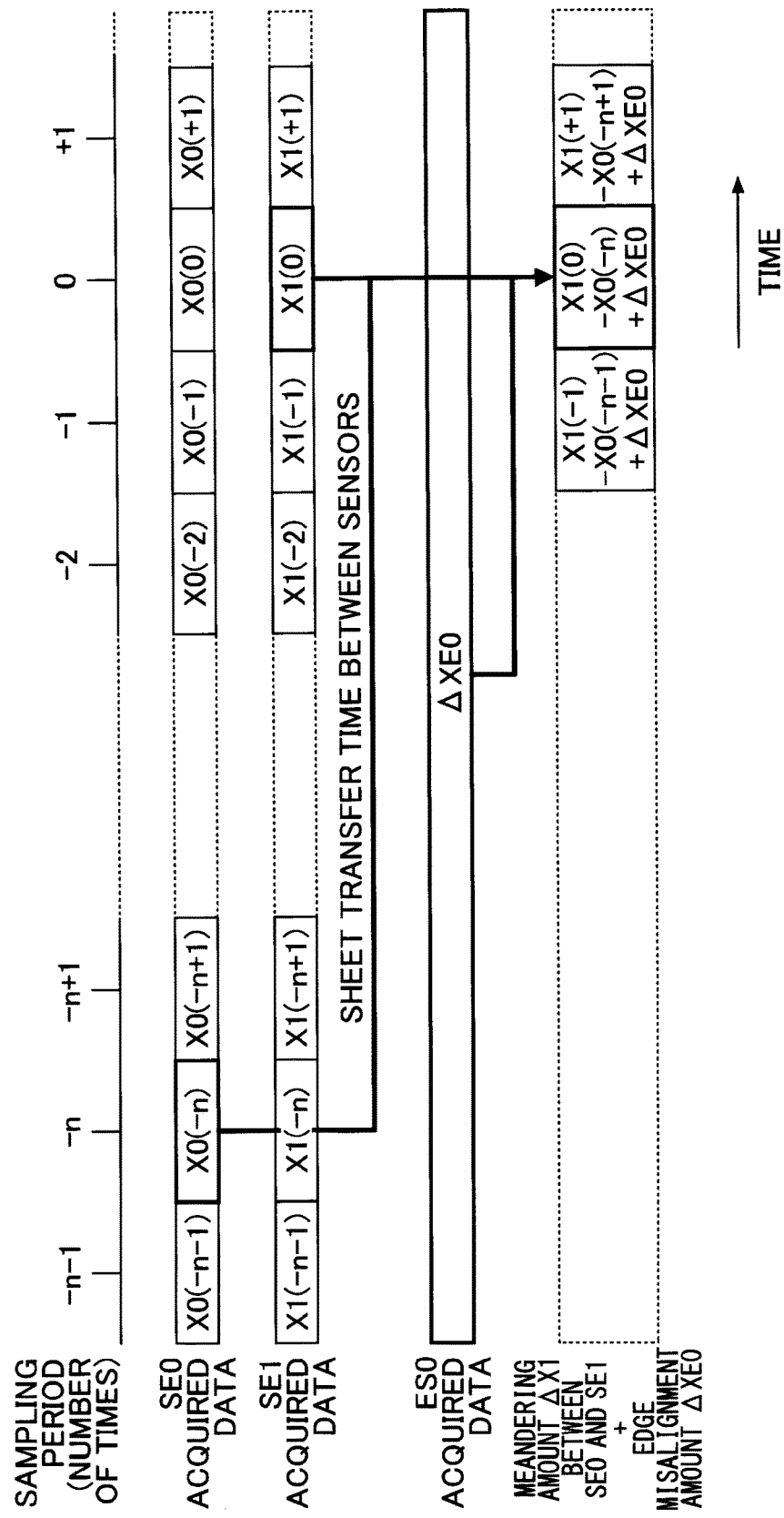

[Fig. 17]
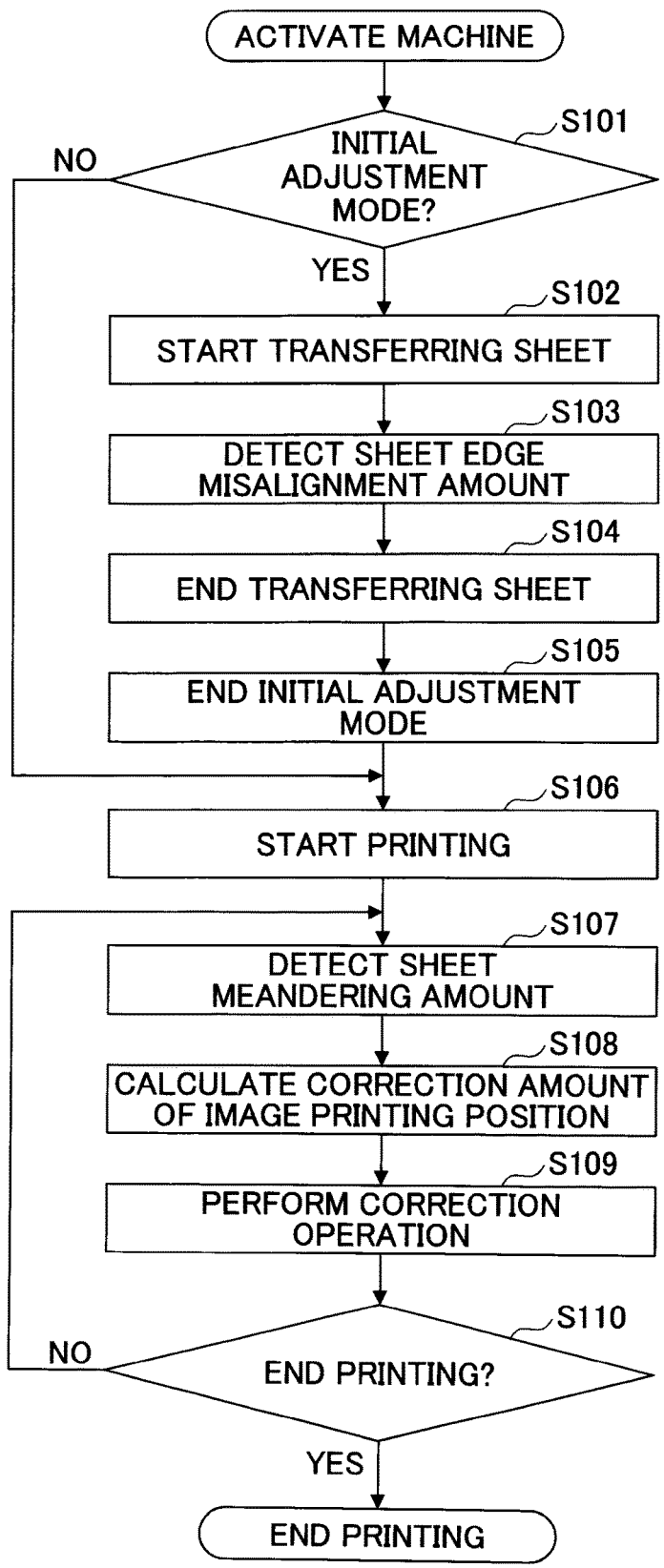

[Fig. 18]
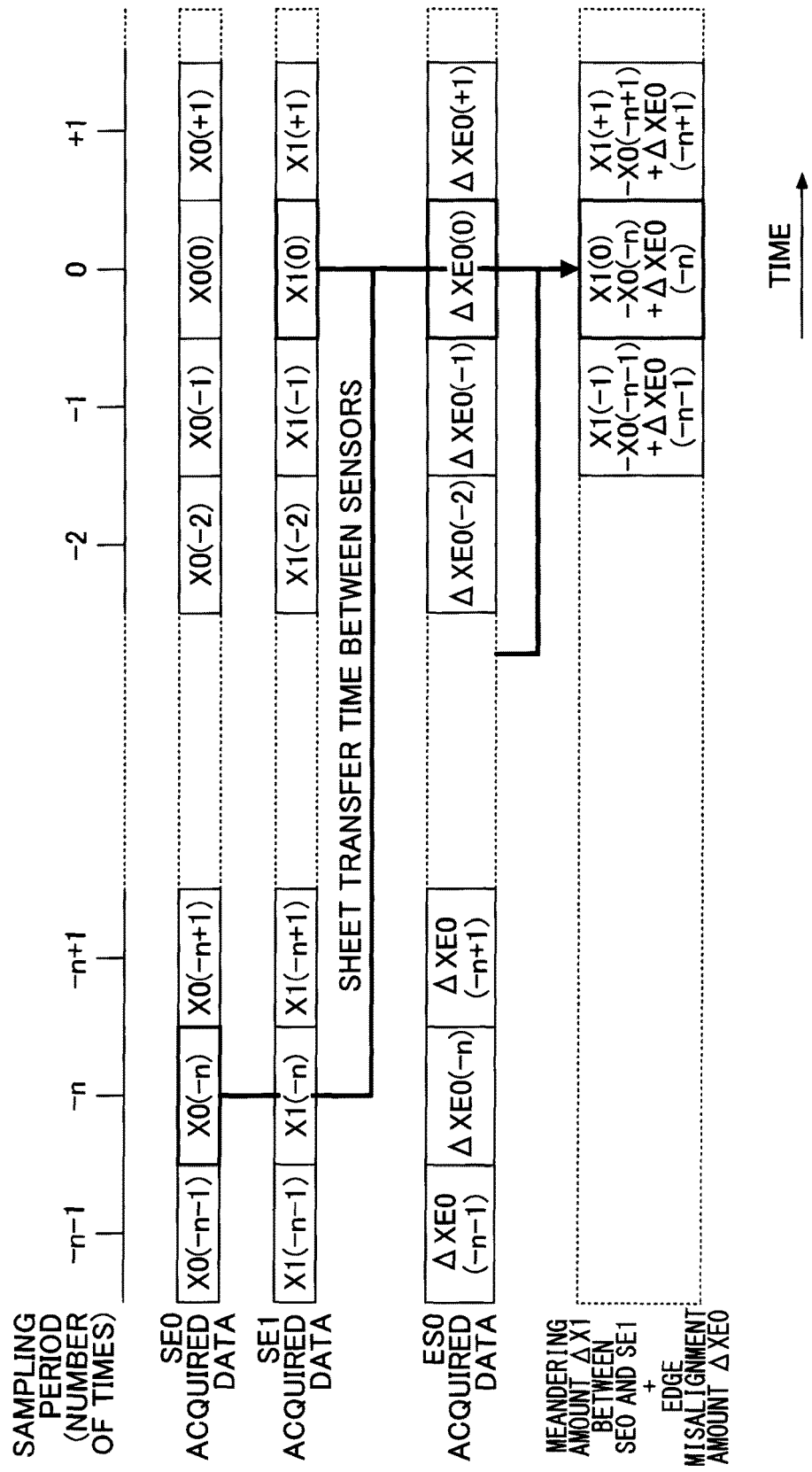

[Fig. 19]
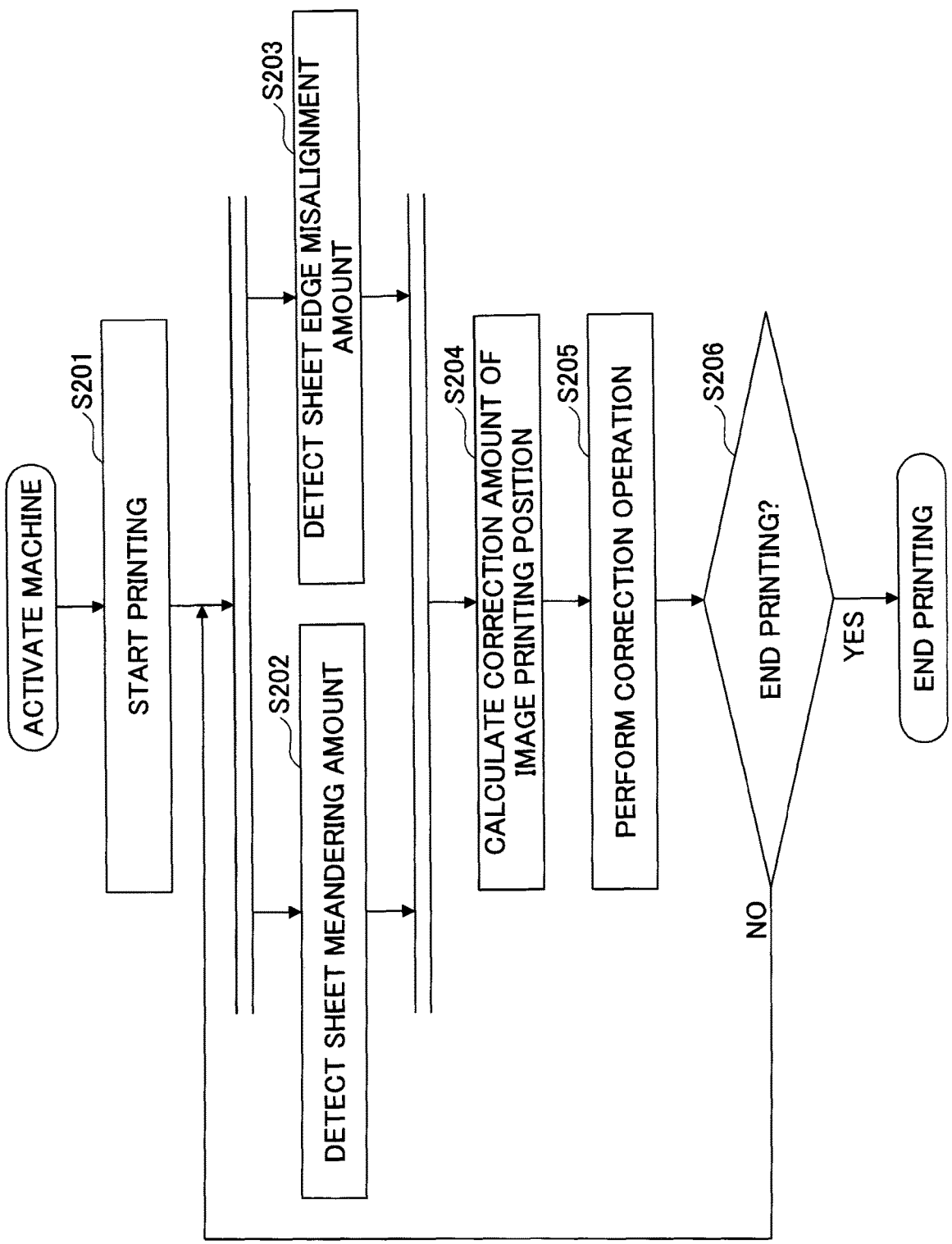

[Fig. 20]
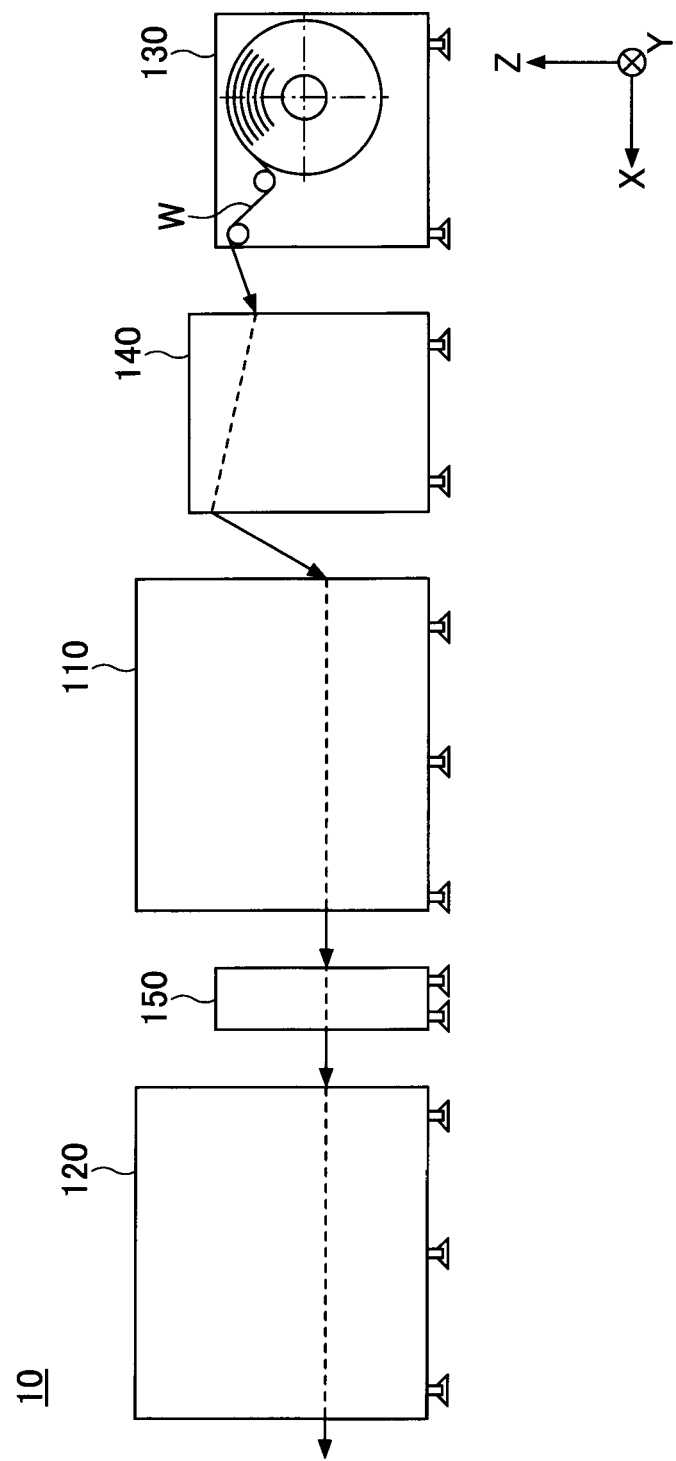

[Fig. 21]
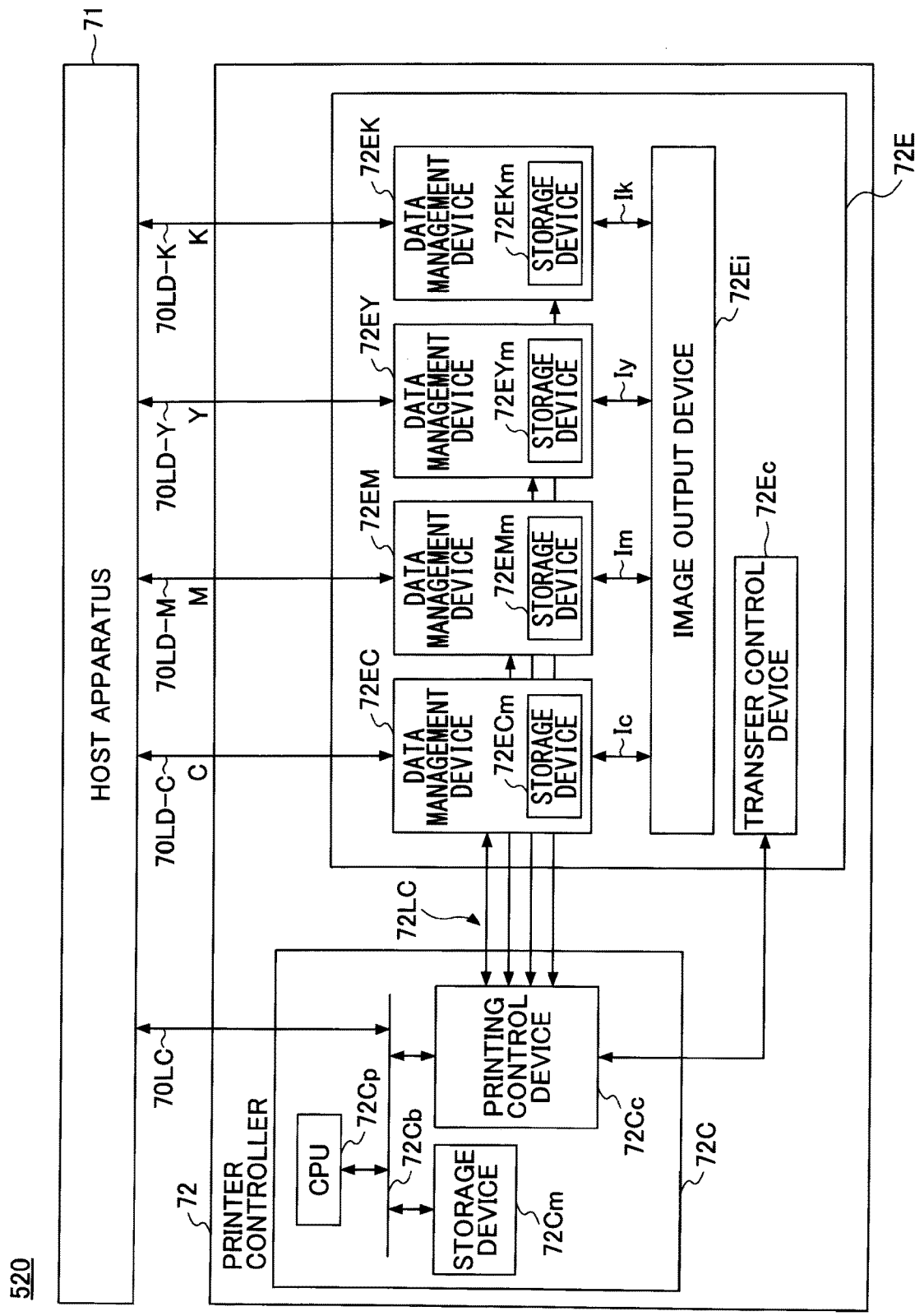

[Fig. 22]
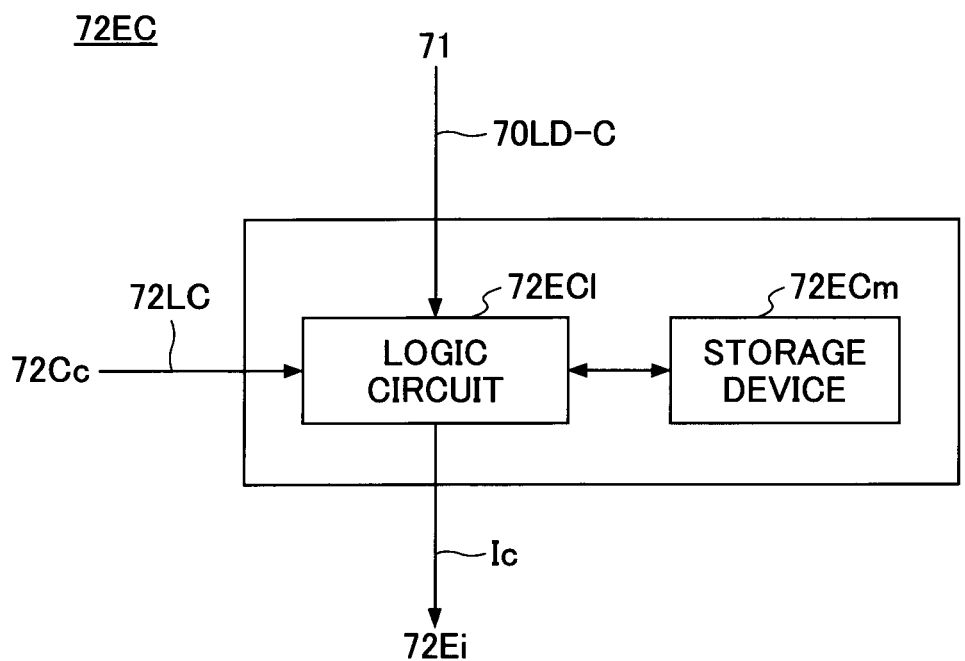
[Fig. 23]
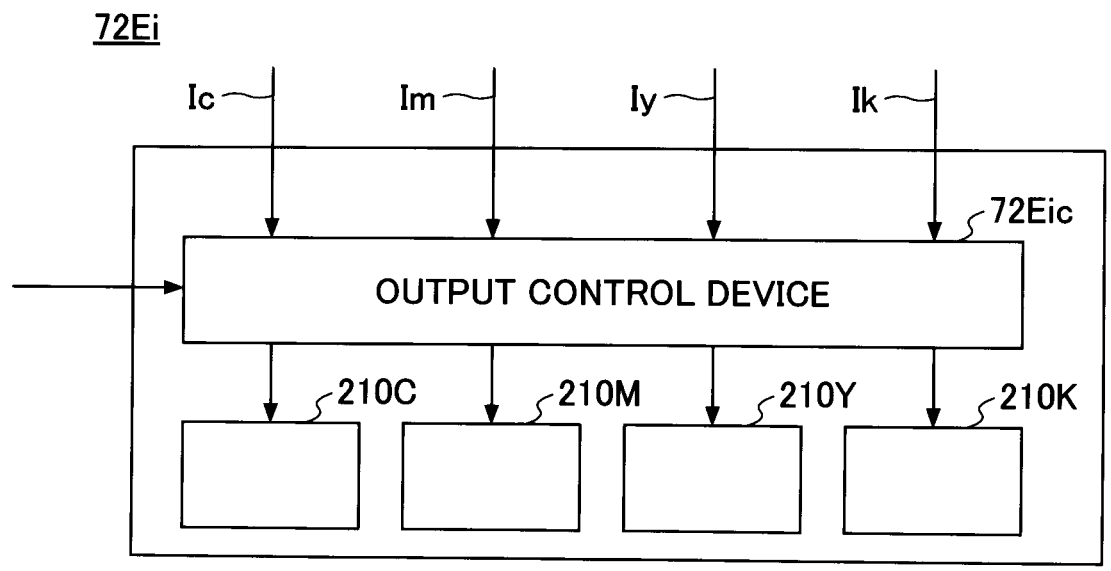

[Fig. 24]
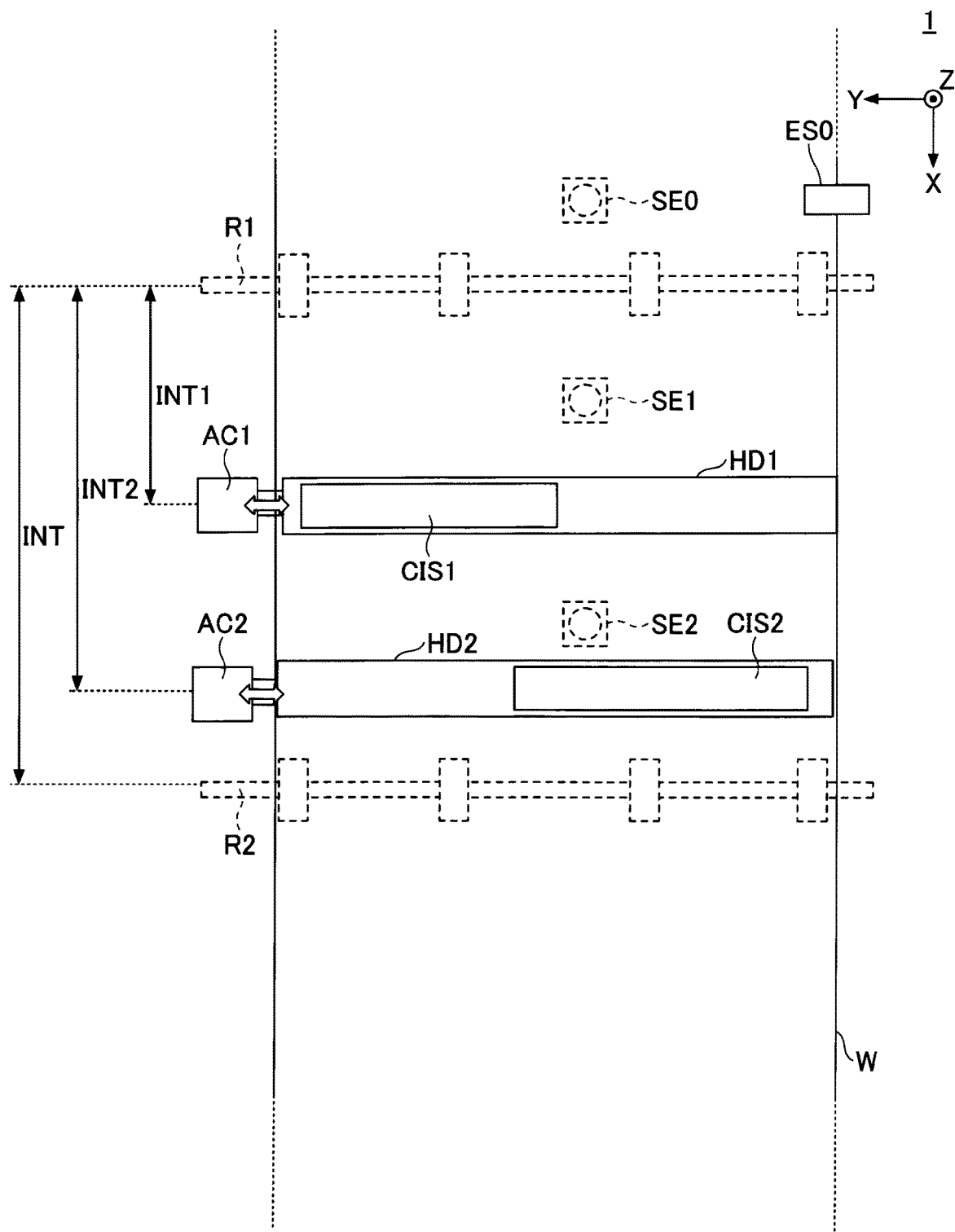

[Fig. 25]
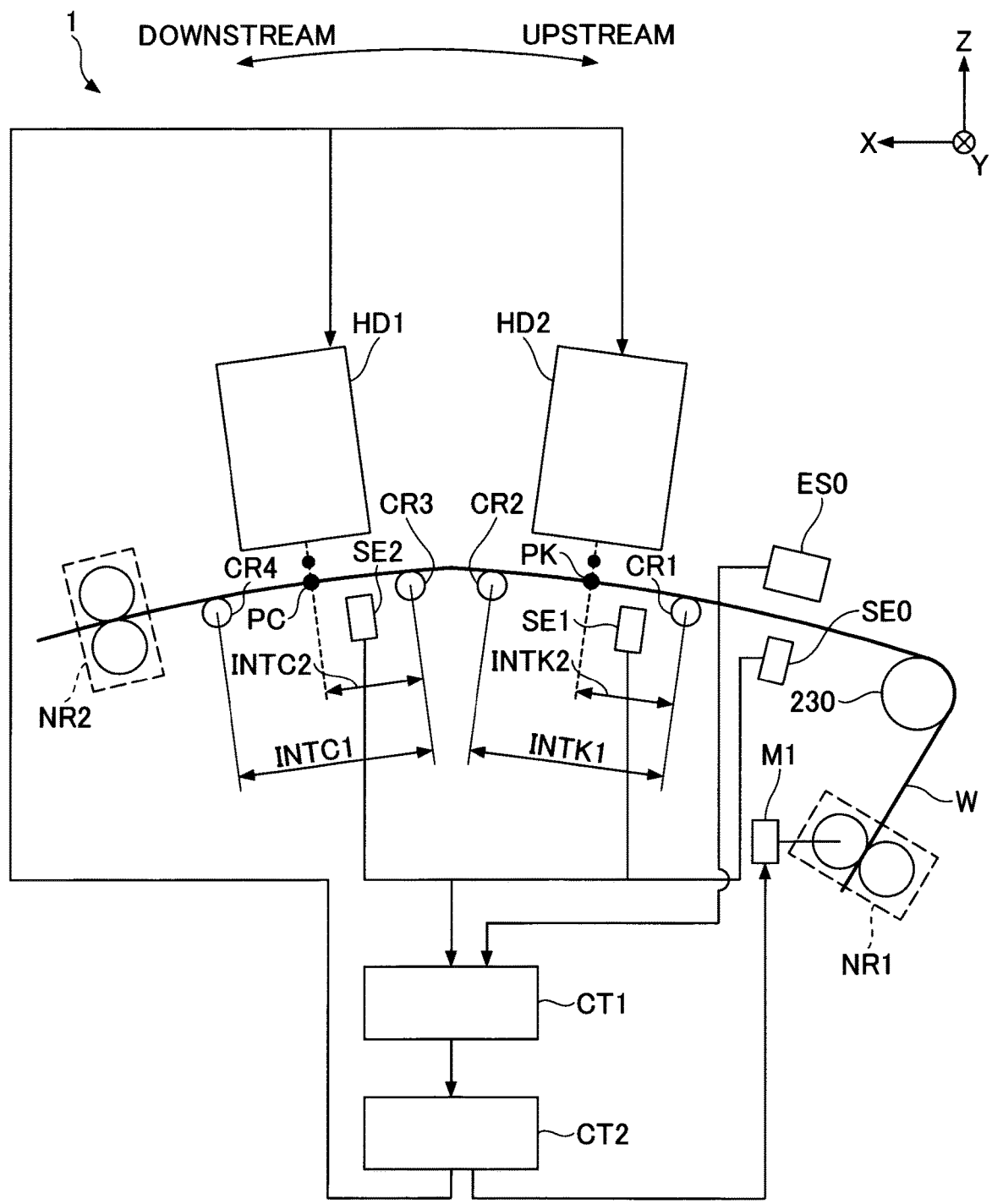

[Fig. 26]
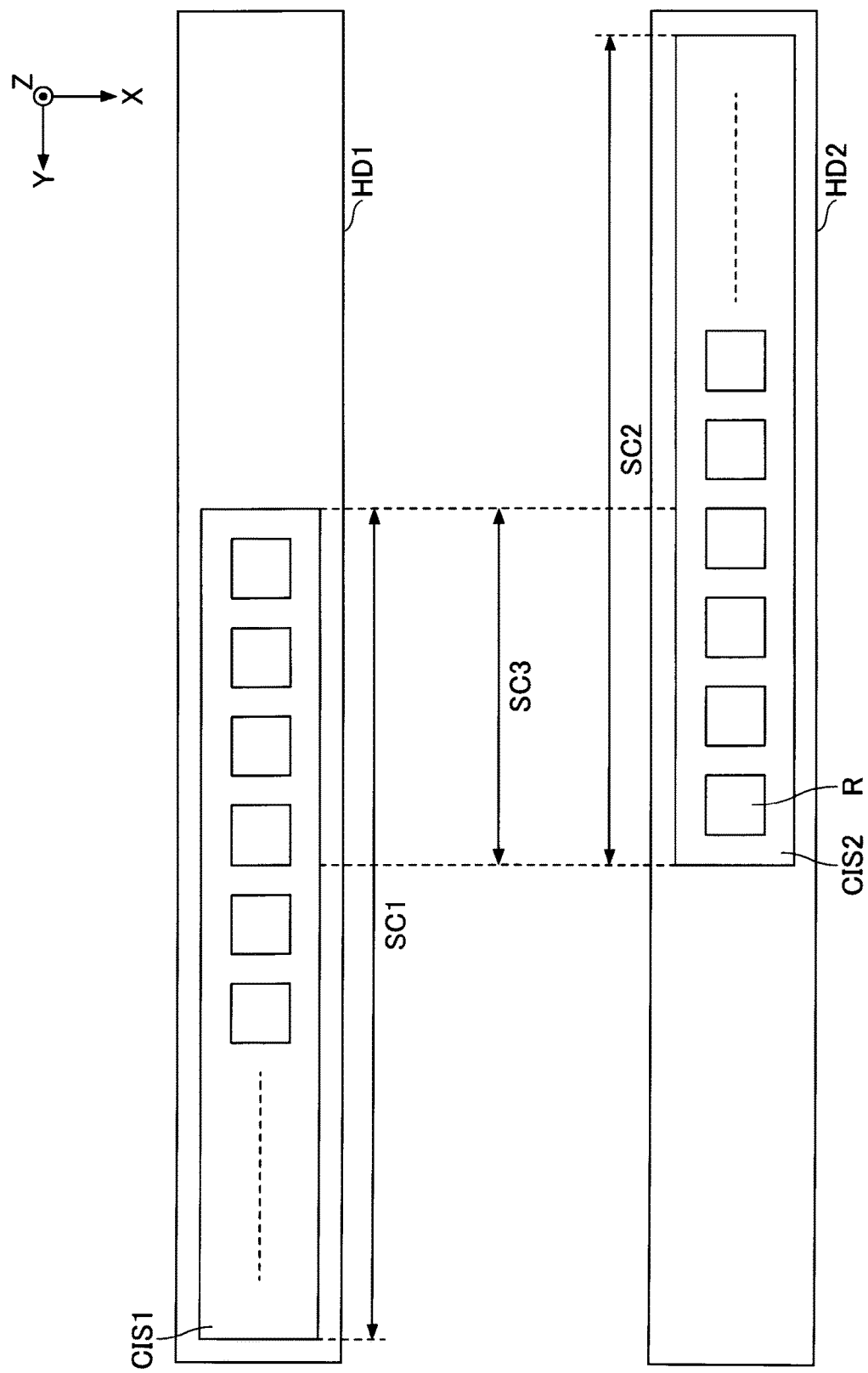

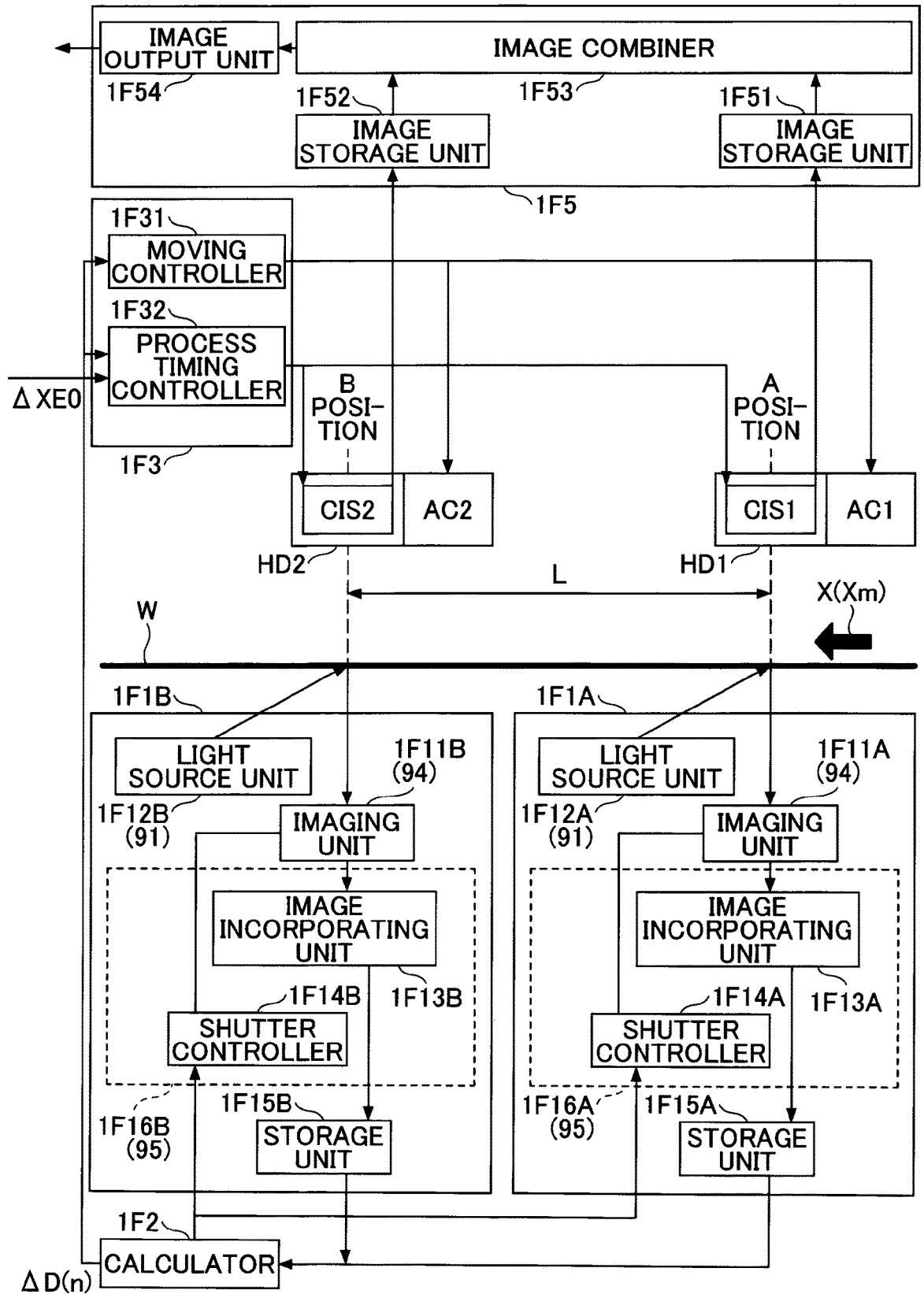
[Fig. 27]

[Fig. 28]
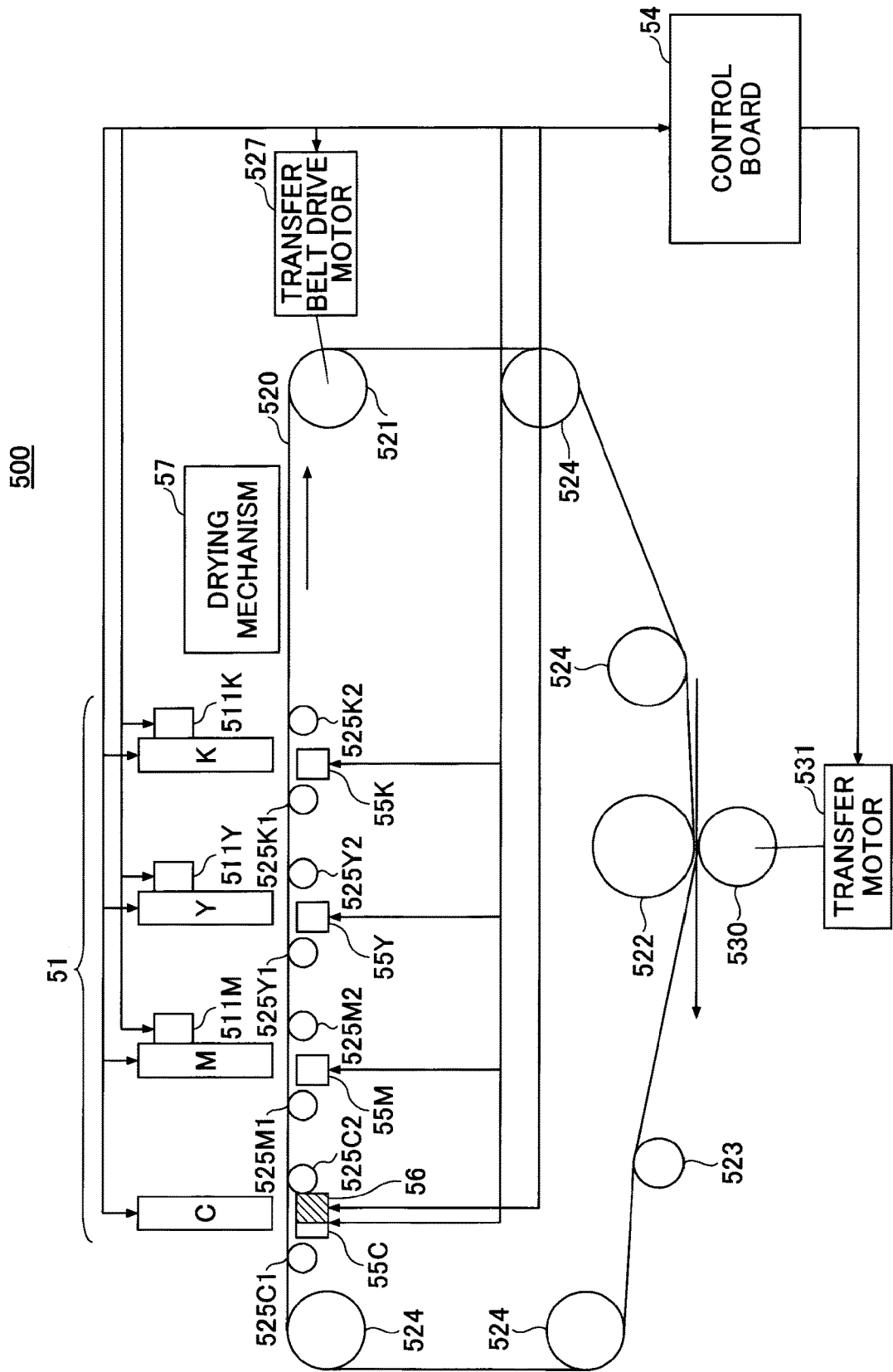

TRANSFER APPARATUS, LIQUID EJECTION APPARATUS, READING APPARATUS, IMAGE FORMING APPARATUS, CONTROL METHOD OF THE TRANSFER APPARATUS

TECHNICAL FIELD

The disclosures discussed herein relate to a transfer apparatus, a liquid ejection apparatus, a reading apparatus, an image forming apparatus, and a control method.

BACKGROUND ART

For an apparatus that processes an object while the object is transferred, it is important to adjust a misaligned timing or a misaligned position to obtain a satisfactory result. For example, a related art technology discloses a method of adjusting print head positions for improving the print quality (e.g., Patent Document 1). Specifically, according to such a method, positional fluctuations in a lateral direction of a printing medium such as a web that passes through a continuous sheet printing system are first detected by sensors. Subsequently, positions of print heads in the lateral direction are adjusted so as to compensate for the positional fluctuations detected by these sensors.

CITATION LIST

Patent Literature

[PTL 1] Japanese Unexamined Patent Application Publication No. 2015-013476

SUMMARY OF INVENTION

Technical Problem

However, with the technology of Patent Document 1, there is a distance from the sensors to the head units, which result in lowering the accuracy in correcting process positions at which the printing medium is processed.

Solution to Problem

According to one aspect of an embodiment, a transfer apparatus includes a head unit configured to perform a process on an object to be transferred in a transfer direction;

a first support member disposed upstream in the transfer direction with respect to a process position at which the transferred object is processed by the head unit, and configured to support the transferred object;

a second support member disposed downstream in the transfer direction of the process position, and configured to support the transferred object;

a surface detector disposed between the first support member and the second support member and configured to detect first surface information of the transferred object;

an upstream surface detector disposed upstream in the transfer direction with respect to the surface detector, and configured to detect second surface information of the transferred object;

an edge detector disposed at a position closer to the upstream surface detector than the surface detector in the transfer direction, and configured to detect an edge in a width direction of the transferred object; and a controller configured to move the head unit based on respective detection results of the surface detector and the upstream surface detector and a detection result of the edge detector.

Advantageous Effects of Invention

According to one aspect of the present invention, in a transfer apparatus, a process position at which an object being transferred is processed may be corrected with higher accuracy in a direction orthogonal to a transfer direction in which the object is transferred.

BRIEF DESCRIPTION OF DRAWINGS

FIG. 1 is a schematic diagram illustrating an example of a transfer apparatus according to an embodiment of the present invention;

FIG. 2 is a schematic top diagram illustrating an example of a liquid ejection apparatus according to a first embodiment of the present invention;

FIG. 3 is a schematic side diagram illustrating another example of the liquid ejection apparatus according to the first embodiment of the present invention;

FIG. 4A is a diagram illustrating an example of an outer shape of a liquid ejection head unit according to a first embodiment of the present invention;

FIG. 4B is a diagram illustrating an example of an outer shape of a liquid ejection head unit according to the first embodiment of the present invention;

FIG. 5 is a flowchart illustrating an example of control related to head unit position correction according to the first embodiment of the present invention;

FIG. 6 is a diagram illustrating an example of functional blocks of a controller according to the first embodiment of the present invention;

FIG. 7 is a perspective diagram illustrating an example of a mechanical configuration of a sensor device according to an embodiment of the present invention;

FIG. 8 is a functional block diagram illustrating an example of control using a surface detector according to an embodiment of the present invention;

FIG. 9 is a configuration diagram illustrating an example of a correlation calculation method according to an embodiment of the present invention;

FIG. 10 is a diagram illustrating an example of a peak position searching method in correlation calculation according to an embodiment of the present invention;

FIG. 11 is a diagram illustrating calculation result examples of the correlation calculation according to an embodiment of the present invention;

FIG. 12 is a block diagram illustrating an example of a hardware configuration for moving liquid ejection head units included in a liquid ejection apparatus according to an embodiment of the present invention;

FIG. 13 is a schematic top diagram illustrating an example of a moving mechanism for moving a liquid ejection head unit included in a liquid ejection apparatus according to one embodiment of the present invention;

FIG. 14 is a schematic top diagram illustrating an example of a liquid ejection apparatus according to a comparative example;

FIG. 15 is a timing chart illustrating an example of a method for calculating a fluctuation amount of an object to be transferred by a liquid ejection apparatus according to a comparative example;

FIG. 16 is a diagram illustrating an example of a method for correcting an image printing position in a case of reading an edge misalignment at initial adjustment according to an embodiment of the present invention;

FIG. 17 is a flowchart illustrating an example of a process for correcting an image printing position in a case of reading sheet edge misalignment at initial adjustment according to an embodiment of the present invention;

FIG. 18 is a diagram illustrating an example of a method for correcting an image printing position in a case of reading an edge misalignment in real time according to an embodiment of the present invention;

FIG. 19 is a flowchart illustrating an example of a method for correcting a writing position in a sheet width direction in a case of reading sheet edge misalignment in real time according to the present invention;

FIG. 20 is a schematic top diagram illustrating an example of a system provided with a transfer apparatus according to a second embodiment of the present invention;

FIG. 21 is a block diagram illustrating an example of a hardware configuration of a controller of the system according to the second embodiment of the present invention;

FIG. 22 is a block diagram illustrating an example of a hardware configuration of a data management device included in the controller of the system according to an embodiment of the present invention;

FIG. 23 is a block diagram illustrating an example of a hardware configuration of an image output device included in the controller according to an embodiment of the present invention;

FIG. 24 is a schematic top diagram illustrating an example of a reading apparatus according to a third embodiment of the present invention;

FIG. 25 is a schematic side diagram illustrating another example of a reading apparatus according to the third embodiment of the present invention;

FIG. 26 is a diagram illustrating an example of an outer shape of reading head units according to the third embodiment of the present invention;

FIG. 27 is a schematic functional block diagram illustrating the reading apparatus according to the third embodiment of the present invention;

FIG. 28 is a schematic side diagram illustrating an intermediate transfer type image forming apparatus according to a fourth embodiment of the present invention.

DESCRIPTION OF EMBODIMENTS

The following illustrates embodiments of the present invention with reference to the accompanying drawings. In the present specification and the drawings, the same reference numerals are assigned to components or elements having substantially the same functional configurations, and duplicated description of the same functional configurations will be omitted.

First Embodiment: Liquid Ejection Apparatus

FIG. 1 is a schematic external diagram illustrating an example of a transfer apparatus according to an embodiment of the present invention. An illustration is given, as a first embodiment of the present invention, of an example where head units included in a transfer apparatus are liquid ejection head units (liquid droplet ejection units) configured to eject liquid, and the transfer apparatus is a liquid ejection apparatus (liquid droplet ejection apparatus configured to eject liquid).

The liquid ejection apparatus, which is an example of a transfer apparatus according to the present embodiment, functions as an image forming apparatus where the ejected liquid is a recording liquid. The recording liquid may, for example, be an aqueous ink, an oily ink, or the like. The following illustrates, as the first embodiment, a configuration of the liquid ejection apparatus acting as the transfer apparatus when used as an image forming apparatus 110.

An object to be transferred by the image forming apparatus 110 is, for example, a recording medium or the like. In the example in FIG. 1, the image forming apparatus 110 ejects liquid onto a web (sheet) W, which is an example of a recording medium transferred by rollers 30 or the like, to form an image on the web W.

Further, the web W may be a so-called continuous sheet-like printing medium or the like. In other words, the web W acting as an object to be transferred is a rollable elongated continuous paper (sheet) or the like. Note that the web W acting as an object to be transferred is not limited to an elongated sheet, but may be a so-called "Z Paper (zig-zag fold paper)" or the like, which is a sheet that may be folded to be stored.

Further, the image forming apparatus 110 illustrated in FIG. 1 may be a printer unit, which is a part of a so-called production printer system. The following illustrates an example in which one or more rollers 30 adjust tension or the like of a web W and transfer the web W in a direction illustrated in FIG. 2 (hereinafter referred to as a "transfer direction X"). Furthermore, in FIG. 1, an X direction indicates the transfer direction, a Y direction indicates a direction orthogonal to the transfer direction (hereinafter also called "orthogonal direction") and also indicates a depth direction of the image forming apparatus 110, and a Z direction indicates a height direction of the image forming apparatus 110.

FIG. 2 is a schematic top diagram illustrating an example of a liquid ejection apparatus according to a first embodiment of the present invention. In this example, the image forming apparatus 110 acting as a liquid ejection apparatus is configured to eject ink of four colors including black (K), cyan (C), magenta (M) and yellow (Y) to thereby form an image on predetermined portions on the web W.

In the example of FIG. 2, head units 210K, 210C, 210M, and 210Y are inkjet printer head modules each configured to eject ink onto the web W. The compositions and the like of ink droplets ejected by the head units are not particularly specified; however, in the first embodiment, ink droplets of black (K), cyan (C), magenta (M), and yellow (Y) are ejected in this order from upstream to downstream in the transfer direction of the web W.

Specifically, it is assumed that the liquid ejection head units are disposed in the order of black (K), cyan (C), magenta (M) and yellow (Y) from upstream to downstream in the transfer direction of the web W. That is, a liquid ejection head unit that is disposed at the most upstream position in the transfer direction is a black (K) liquid ejection head unit (hereinafter referred to as a "black liquid ejection head unit 210K"). A liquid ejection head unit that is disposed at the second most upstream position following the black liquid ejection head unit 210K is a cyan (C) liquid ejection head unit (hereinafter referred to as a "cyan liquid ejection head unit 210C"). Further, a liquid ejection head unit that is disposed at the third most upstream position following the cyan liquid ejection head unit 210C is a magenta (M) liquid ejection head unit (hereinafter referred to as a "magenta liquid ejection head unit 210M"). Subsequently, a liquid ejection head unit that is disposed at the most downstream position in the transfer direction is a yellow (Y) liquid ejection head unit (hereinafter referred to as a "yellow liquid ejection head unit 210K").

The image forming apparatus 110 illustrated in FIG. 2 is provided with support rollers R0 to R5 acting as a transfer mechanism configured to transfer a web W while applying tension to the web W.

In the configuration illustrated in FIG. 2, multiple line-type head units 210K, 210C, 210M, and 210Y each having a configuration extending along the width direction are disposed between corresponding adjacent support rollers R1 to R5. More specifically, the head unit 210K is disposed between the support rollers R1 and R2, the head unit 210C is disposed between the support rollers R2 and R3, and the head unit 210M is disposed between the support rollers R3 and R4, and the head unit 210Y is disposed between the support rollers R4 and R5.

Thus, the support roller R1 functions as a first support member at an upstream position with respect to the head unit 210K. The support roller R2 functions as a second support member at a downstream position with respect to the head unit 210K and also functions as a first support member at an upstream position with respect to the head unit 210C. Similarly, the support roller R3 functions as a second support member with respect to the head unit 210C and also functions as a first support member with respect to the head unit 210M. The support roller R4 functions as a second support member with respect to the head unit 210M and also functions as a first support member with respect to the head unit 210Y. The support roller R5 functions as a second support member with respect to the head unit 210Y.

Further, actuators A1, A2, A3, and A4 configured to move the head units in directions perpendicular to the transfer direction are respectively connected to the head units 210K, 210C, 210M, and 210Y.

Further, the image forming apparatus 110 is provided with sensor devices (surface detection sensor devices) SE1, SE2, SE3, and SE4 disposed below the head units 210K, 210C, 210M, and 210Y, and is also provided with a sensor device SE0 and an edge sensor ES0 disposed upstream of the head unit 210K.

In FIG. 2, the sensor devices SE1, SE2, SE3, and SE4 indicated by dotted lines are located between corresponding adjacent support rollers that interpose the head units. In addition, the sensor devices SE1, SE2, SE3, and SE4 are located below the respective head units 210K, 210C, 210M, and 210Y, and are also located below the web W.

Similarly, a sensor device (upstream surface detection sensor) SE0 indicated by a dotted line is disposed upstream of the head unit 210K and a support roller R1, and is also located below the web W. The upstream surface detection sensor device SE0 functions as an upstream surface detector or a part of the upstream surface detector.

The sensor devices (surface detection sensors) SE1, SE2, SE3, and SE4 and the sensor device (upstream surface detection sensor device) SE0 are provided for detecting a meandering amount of the web W or a positional misalignment amount in the transfer direction. The sensor devices SE1, SE2, SE3, and SE4 each function as a surface detector or a part of the surface detector.

The edge sensor (edge detector) ES0 is disposed upstream of the head unit 210K and the support roller R1 and also disposed in line with the sensor device SE0 in a sheet width direction.

Further, an upstream support roller R0 disposed upstream of the head unit 210K is a driven roller, and an encoder E is mounted on the driven roller (support roller) R0. This encoder E is configured to detect a feed amount (transfer distance) of the web W being transferred.

In FIG. 2, a distance between the upstream surface detection sensor device SE0 and the edge sensor ES0 in the transfer direction is shorter than a distance between the surface detector SE1 and the edge sensor ES0. That is, in the transfer direction, the edge sensor ES0 is disposed at a position closer to the upstream surface detection sensor device SE0 than to the surface detection sensor device SE1.

In this case, the edge sensor ES0 is preferably aligned with the upstream sensor device SE0 acting as an upstream surface detection sensor in a direction orthogonal to the transfer direction.

In FIG. 2, the support rollers R2, R3, and R4 are disposed between corresponding adjacent head units. However, the number of support rollers disposed between corresponding adjacent head units is not limited to one; two or more support rollers may be disposed between corresponding adjacent head units as illustrated in FIG. 3.

FIG. 3 is a schematic side diagram illustrating another example of the liquid ejection apparatus according to an embodiment of the present invention. In FIGS. 1 and 2, an illustration is given of an example of the liquid ejection apparatus in which the transfer direction X is a horizontal direction. However, in the liquid ejection apparatus, since tension is applied to a surface of the web W to which liquid droplets are ejected, the transfer direction X may be slightly curved in an upward direction so as to transfer a web W in an Xm direction.

As illustrated in FIG. 3, two pairs of nip rollers NR1 and NR2, a roller 230, and the like are disposed as transfer driving units at opposite ends of a set of the support rollers CR1K to CR2Y that interpose the head units 210K, 210C, 210M and 210Y. Hereinafter, of the two pairs of nip rollers, the pair of nip rollers NR1 disposed at an upstream position from the liquid ejection head units is referred to as a "first nip roller". By contrast, the pair of nip rollers NR2 disposed at a downstream position from the liquid ejection head units and the pair of nip rollers NR1 is referred to as a "second nip roller". As illustrated in FIG. 3, the first and second nip rollers NR1 and NR2 rotate while sandwiching an object to be transferred such as a web W.

In addition, it is preferable that a recording medium constituting a web W has an elongated form. Specifically, it is preferable that the length of the recording medium is longer than the distance between the first nip roller NR1 and the second nip roller NR2.

Each of the liquid ejection head units 210K, 210C, 210M, and 210Y ejects ink of corresponding color to a predetermined portion of the web W based on image data or the like. The positions at which the ejected ink land on the web W (hereinafter referred to as "landing positions") are almost immediately below the liquid ejection head units. According to the present embodiment, the following illustrates an example in which a process position where a process is performed by each liquid ejection head unit is a landing position.

In this example, black ink is landed on a landing position (hereinafter referred to as "black landing position PK") of the black liquid ejection head unit 210K. Likewise, cyan ink is landed on a landing position (hereinafter referred to as "cyan landing position PC") of the cyan liquid ejection head unit 210C. Further, magenta ink is landed on a landing position (hereinafter referred to as "magenta landing position PM") of the magenta liquid ejection head unit 210M. Further, yellow ink is landed on a landing position (hereinafter referred to as "yellow landing position PY") of the yellow liquid ejection head unit 210Y. Note that a timing at which each liquid ejection head unit ejects ink is controlled, for example, by a controller 300 connected to each of the liquid ejection head units.

Further, in the example illustrated in FIG. 3, two or more rollers are disposed for each of the liquid ejection head units. Of the multiple rollers, one of the two adjacent rollers is disposed at an upstream position and the other at a downstream position with respect to a corresponding one of the liquid ejection head units so as to interpose the corresponding liquid ejection head unit. In the example in FIG. 3, first rollers CR1K, CR1C, CR1M, and CR1Y used for transferring the web W to the respective landing positions are disposed at upstream positions with respect to the respective liquid ejection head units. In addition, second rollers CR2K, CR2C, CR2M, and CR2Y used for transferring the web W from the respective landing positions are disposed at the downstream positions with respect to the respective liquid ejection head units.

Specifically, in order to accurately land black ink, a black first roller CR1K for transferring the web W to a black landing position PK is disposed at a predetermined portion of the web W. Further, a black second roller CR2K for transferring the web W is disposed at a downstream position from the black landing position PK.

In a similar manner, a cyan first roller CR1C and a cyan second roller CR2C are disposed with respect to the cyan liquid ejection head unit 210C. Further, a magenta first roller CR1M and a magenta second roller CR2M are disposed with respect to the magenta liquid ejection head unit 210M. Similarly, a yellow first roller CR1Y and a yellow second roller CR2Y are disposed with respect to the yellow liquid ejection head unit 210Y.

When the first roller and the second roller are disposed as illustrated above, so-called "flapping" is reduced at each of the landing positions. Note that the first roller and the second roller may, for example, each be used to transfer a recording medium, and may be a driven roller. Further, the first roller and the second roller may be rollers driven to rotate by a motor or the like.

In the example illustrated in FIG. 3, with respect to the head units 210K, 210C, 210M, and 210Y of the respective colors, the first rollers CR1K, CR1C, CR1M, and CR1Y function as first upstream support members, and the second rollers CR2K, CR2C, CR2M, and CR2Y function as second downstream support members.

Note that the first roller as an example of the first support member and the second roller as an example of the second support member do not need to be rotating bodies such as a driven roller or the like. That is, the first roller and the second roller may be any support members configured to support an object to be transferred. For example, the first support member and the second support member may be pipes, shafts, or the like having a circular cross section. Alternatively, the first support member and the second support member may be a curved plate or the like having a circular arc portion in contact with an object to be transferred.

Further, as illustrated in FIGS. 2 and 3, the image forming apparatus 110 includes a per-head-unit sensor device as a surface detection sensor disposed for each liquid ejection head unit. The per-head-unit sensor device functions as a surface detector. Note that the sensor devices SE1, SE2, SE3, and SE4 illustrated in FIG. 2 and the sensor devices SENK, SENC, SENM, and SENY illustrated in FIG. 3 have the same function, although their arrangement positions and the like are slightly different.

Further, the image forming apparatus 110 further includes an upstream sensor device (upstream surface detection sensor) SEN2 at an upstream position with respect to the per-head-unit sensor devices SE1 to SE4, in addition to the per-head-unit sensor devices SE1 to SE4. Note that the sensor device SE0 illustrated in FIG. 2 and the sensor device SEN2 illustrated in FIG. 3 have the same function.

The arrangement configuration of the sensor devices may be either of FIG. 2 and FIG. 3; hence, in FIG. 4 and subsequent figures, the sensor devices will be described using reference symbols SE0 to SE4.

More specifically, in the examples illustrated in FIGS. 2 and 3, the image forming apparatus 110 includes five sensor devices for detecting a relative position; that is, four per-head-unit sensor devices and one upstream sensor device are combined to be a total of five sensor devices. These sensors irradiate a surface of a web W with light so as to image an uneven pattern (paper pattern, speckle pattern) specific to a position of the irradiation surface of the web W to detect the surface information.

In the following description, the per-head-unit sensor devices SE1 to SE4 and the upstream sensor device SE0 may also be collectively and simply referred to as "sensor devices". Note that configurations and arrangement positions of the sensors are not limited to those illustrated in the present specification and drawings.

In FIGS. 2 and 3, a total number of five sensor devices are illustrated; however, the number of sensor devices for detecting a relative position is not limited to five. That is, as illustrated in FIG. 2, the total number of sensor devices that includes the number of per-head-unit sensor devices and the number of upstream sensor devices may be greater than the number of liquid ejection head units. For example, two or more sensor devices may be disposed for each liquid ejection head unit. Similarly, two or more upstream sensor devices may be disposed.

As sensor devices, an optical sensor utilizing light such as infrared light, a sensor utilizing a laser, air pressure, photoelectric or ultrasonic wave, or the like may be used. Note that an optical sensor may, for example, be a CCD (Charge Coupled Device) camera or a CMOS (Complementary Metal Oxide Semiconductor) camera or the like. A configuration example of a sensor device will be described later with reference to FIG. 7, for example.

Here, it is preferable that a position at which each per-head-unit sensor is disposed is a position close to a landing position from the corresponding head unit. When each per-head-unit sensor device is disposed at a position close to a corresponding landing position, the distance between the landing position and the per-head-unit sensor device is reduced. As the distance between the landing position and the per-head-unit sensor device is reduced, errors in detection may be reduced. Thus, the image forming apparatus may precisely detect, using the per-head-unit sensor devices, relative positions of a recording medium between the multiple detection results in the orthogonal direction and the transfer direction.

Specifically, a position close to the landing position is between the first roller and the second roller. That is, in the example illustrated, it is preferable that the position at which the black sensor device SENK is disposed be an inter-black roller section INTK1 as illustrated in FIG. 3. Similarly, it is preferable that the position at which the cyan sensor device SENC is disposed be an inter-cyan roller section INTC1. Further, it is preferable that the position at which the magenta sensor device SENM is disposed be an inter-magenta roller section INTM1. Further, it is preferable that the position at which the yellow sensor device SENY is disposed be an inter-yellow roller section INTY1.

As described above, when a per-head-unit sensor device is disposed between the corresponding rollers, the per-head-unit sensor device may detect the position or the like of a recording medium at a position close to each landing position. In addition, the moving speed between rollers may be relatively stable. Thus, the image forming apparatus may be enabled to accurately detect the position of the recording medium in the orthogonal direction.

In FIG. 2, a distance between the upstream surface detection sensor device SE0 and the edge sensor ES0 in the transfer direction is shorter than the distance between the surface detector SE1 and the edge sensor ES0. In this case, the edge sensor ES0 is preferably disposed at a position aligned with the upstream sensor device SE0, acting as an upstream surface detection sensor, in the orthogonal direction.

Further, it is preferable that the position between the rollers at which a per-head-unit sensor device is disposed be closer to the first roller than is the landing position. That is, as illustrated in FIG. 3, it is preferable that the position at which the per-head-unit sensor device is disposed is an upstream position with respect to the corresponding landing position.

Specifically, it is preferable that the position at which the black sensor device SENK is disposed be between the black landing position PK and the position at which the black first roller CR1K is disposed, in a direction from the black landing position PK towards upstream (hereinafter referred to as a "black upstream section INTK2"). Likewise, it is preferable that the position at which the cyan sensor device SENC is disposed be between the cyan landing position PC and the position at which the cyan first roller CR1C is disposed in an upstream direction from the cyan landing position PC (hereinafter referred to as a "cyan upstream section INTC2"). Further, it is preferable that the position at which the magenta sensor device SENM is disposed be between the magenta landing position PM and the position at which the magenta first roller CR1M is disposed in an upstream direction from the magenta landing position PM (hereinafter referred to as a "magenta upstream section INTM2"). Further, it is preferable that the position at which the yellow sensor device SENY is disposed be between the yellow landing position PY and the position at which the yellow first roller CR1Y is disposed in an upstream direction from the yellow landing position PY (hereinafter referred to as a "yellow upstream section INTY2").

When the per-head-unit sensor devices are disposed at the black upstream section INTK2, the cyan upstream section INTC2, the magenta upstream section INTM2, and the yellow upstream section INTY2, the image forming apparatus may be enabled to accurately detect the position of the recording medium in the orthogonal direction. Further, when a per-head-unit sensor device is disposed at such a position, the per-head-unit sensor device is disposed at an upstream position from the corresponding landing position. The image forming apparatus may be enabled to accurately detect a position of the recording medium by each of the per-head-unit sensor devices at upstream positions with respect to the landing positions, and enabled to calculate a timing at which each liquid ejection head unit ejects, the amount of moving of each liquid ejection head unit, or a combination of these.

That is, when a position of the web W is detected at an upstream position with respect to a landing position and then the web W is transferred to the landing position at the downstream position, a timing of ejecting the liquid, a moving amount of the liquid ejection head unit, or a combination of these is calculated. Therefore, each of landing positions may be accurately changed in the corresponding one of the liquid ejection head units in the transfer direction, the orthogonal direction, or both directions.

Liquid Ejection Head

FIGS. 4A and 4B are diagrams illustrating an example of an outer shape of the liquid ejection head unit according to an embodiment of the present invention. FIG. 4A is a schematic plan diagram illustrating an example of four liquid ejection head units 210K to 210Y included in the image forming apparatus 110.

As illustrated in FIG. 4A, each liquid ejection head unit is a line type liquid ejection head unit in this example. That is, the image forming apparatus 110 has four liquid ejection head units 210K, 210C, 210M, and 210Y corresponding to black (K), cyan (C), magenta (M), and yellow (Y) from the upstream in the transfer direction X.

Further, in this example, the black (K) liquid ejection head unit 210K includes four heads 210K-1, 210K-2, 210K-3 and 210K-4 that are arranged in a staggered manner in the orthogonal direction. As a result, the image forming apparatus 110 may form an image in the entire area in a width direction (orthogonal direction) in the area (printing area) where the image is formed on the web W. Since the configurations of the other liquid ejection head units 210C, 210M and 210Y are the same as the configuration of the black (K) liquid ejection head unit 210K, description of these configurations will be omitted.

Note that in this example, the liquid ejection head unit is composed of four heads arranged in a staggered manner; however, the liquid ejection head unit may be composed of a single head that covers the width direction in one row, or may be composed of multiple heads continuously and closely arranged in the width direction.

Head Position Control

The following illustrates an outline of position correction control of a head unit with reference to FIGS. 5 and 6.

FIG. 5 is a flowchart illustrating an example of control related to head unit position correction according to the first embodiment of the present invention. FIG. 6 is a diagram illustrating an example of functional blocks of a controller of the image forming apparatus according to the first embodiment of the present invention.

In FIG. 5, after sheet transfer is started in step S1, in step S2, a reflected paper pattern (speckle pattern) of the web (sheet) W is imaged (detected) by the surface detection sensor devices (sensor devices SE0 to SE4). Subsequently, in accordance with the detection result of step S2, a sheet meandering amount is calculated (step S3).

More specifically, while the web (sheet) W is being transferred, image data are incorporated at a predetermined sampling period by the sensor devices SE1, SE2, SE3, and SE4 installed below the respective head units, and the sensor device SE0 disposed upstream of the head units.

Subsequently, in accordance with the detection result of step S2, a sheet meandering amount is calculated (step S3). Specifically, based on correlation calculation results between the sensor devices SE1, SE2, SE3, SE4 installed corresponding to the respective head units and the upstream sensor device SE0 disposed upstream of the head units, relative positions of the web (sheet) between the detected results of the sensor devices, or a meandering amount of the (web) sheet between the sensor devices is calculated.

Simultaneously with the above-described operation, the edge sensor ES0 detects the position of an edge of the web W being transferred in step S4, and the edge misalignment amount is calculated in step S5.

In step S6, the head unit correction amount is calculated using the sheet meandering amount calculated in step S3 and the edge misalignment amount calculated in step S5. Based on the calculated head unit correction amount, drive instructions are indicated to actuators A1 to A4 (see FIG. 6) in step S7.

Thereafter, the head units 210 are moved by driving the actuators A1 to A4 in step S8. In this case, since the actuators A1 to A4 are set to drive at an integral multiple of the sampling period of the sensor devices, the actuators A1 to A4 are driven by the calculated sheet meandering amount.

The following illustrates, with reference to FIG. 6, a method for calculating the edge misalignment amount based on the detected edge results obtained in steps S4 and S5 in FIG. 5.

In FIG. 6, the controller 300 includes a meandering amount calculator 310, an edge misalignment amount calculator 320, a head unit correction amount calculator 330, an actuator drive instruction unit 340, and an ejection timing adjuster 350 that are all executable.

The edge misalignment amount calculator 320 includes a comparator 321, a reference value storage unit 322, a misalignment amount calculator 323, and a previous position storage unit 324.

It is assumed that a reference position serving as a reference with respect to the sheet end (edge) read by the edge sensor ES0 is set in advance and stored in the reference value storage unit 322. The comparator 321 compares the detected edge position of the sheet and the reference position to obtain a misalignment amount from the reference position in the acquired sheet edge data.

In addition, simultaneously with the edge misalignment amount calculation, the meandering amount calculator 310 calculates a sheet meandering amount at the head units 210K, 210C, 210M, and 210Y. Color matching between the head units 210K, 210C, 210M, and 210Y may be performed by moving the head units by the respective actuators based on the calculated meandering amounts. That is, the landing positions of the liquid droplets ejected on the sheet from the respective nozzles of the heads 210-1, 210-2, 210-3, and 210-4 of the head units may be aligned in line with one another in a width direction.

Further, the sheet edge misalignment amount is calculated by the edge misalignment amount calculator 320 at a position upstream with respect to the head units, and correction is commonly applied in the head units 210K, 210C, 210M, and 210Y based on the calculated sheet edge misalignment amount.

The head unit correction amount calculator (head moving amount calculator) 330 adds position alignment correction based on the sheet meandering amount during sheet transfer calculated from the surface detection sensors and write position correction using the sheet edge misalignment amount via an adder 331 to correct an image printing position.

Thus, the head units 21K to 21Y are moved by a moving amount ΔX (ΔX1 to ΔX4) in accordance with the calculated sheet meandering amount and the sheet edge misalignment amount, using the actuators A1 to A4. The respective colors may thus be aligned with respect to the web (sheet) W and droplets may be landed at desired positions on the sheet.

Accordingly, using the surface detection sensor devices SE0 to SE4, it is possible to adjust relative positions between the respective colors with respect to the sheet W, and adjust the absolute position on the sheet by correcting each misalignment amount with respect to the reference position. Thus, it is possible to improve the accuracy in the writing start position in the sheet width direction. This makes it possible to improve print quality.

In this case, the edge sensor ES0 is preferably disposed at a position aligned with the upstream sensor device SEN2 acting as an upstream surface detection sensor in the orthogonal direction. That is, when the misalignment amount detected by the edge sensor ES0 is added to the relative misalignment amount between the upstream sensor device SEN2 and the black sensor device SENK, the head unit 210K is enabled to form an image at a predetermined position from the edge position in the orthogonal direction. Note that in a case where there is little movement in the orthogonal direction from the installation position of the edge sensor ES0 to the upstream sensor device SEN2, either one of these sensors may be arranged upstream. Further, the meandering amount calculator 310 is enabled to obtain the transfer speed by the surface detection sensor devices SE0 to SE4, and the ejection timing adjuster 350 outputs a timing signal SIG for adjusting ejection timing of ink droplets of the head units 21K to 21Y based on information on the transfer speed.

Configuration of Detector

FIG. 7 is a perspective diagram illustrating an example of a mechanical configuration of a sensor device according to an embodiment of the present invention. This configuration is applicable to both types of the sensor devices SE1 to SE4 (first sensor device SEN1) of different colors and the upstream sensor device SE0 (second sensor device SEN2).

The sensor device illustrated in FIG. 7 is configured to capture an image of an uneven paper pattern (hereinafter referred to as a speckle pattern) that is identifiable upon irradiating the surface of an object formed of paper fibers such as a web with light. The capturing of the image of the speckle pattern is an example of detection of the surface information of the web.

Specifically, the sensor device has a semiconductor laser light source (LD) 91 as an example of a light source unit (light emitting unit) and a collimating optical system (CL) 92. In addition, in order to capture an image illustrating a speckle pattern or the like, the sensor device has a CMOS image sensor 94 and a telecentric imaging optical system 93 for focusing and imaging a speckle pattern on the CMOS image sensor 94.

As a first position detection method that is executable using the sensor device of FIG. 7, correlation calculation or the like is performed by the controller 300 or the like, using an image indicating a speckle pattern or the like captured by one sensor device and image data indicating the speckle pattern captured by another sensor device. The controller 300 outputs the relative position, the moving amount, the moving speed, or a combination of the relative position, the moving amount, the moving speed, and the like of the object between the detection result of one sensor device and the detection result of another sensor device, based on the moving amount of the correlation peak position calculated in the correlation calculation.

Note that in FIG. 7, an example of a casing covering the sensor device has a size of a width w×depth d×height h being 15×60×32 [mm].

The CMOS image sensor 94 illustrated in FIG. 7 is an example of an imaging unit, and an FPGA (field-programmable gate array) 95 is an example of an imaging controller.

FIG. 8 is a functional block diagram illustrating an example of control using a surface detector according to an embodiment of the present invention. For example, the surface detector 110F10 may be implemented by a sensor device SEN alone as illustrated in FIG. 7, or the surface detector 110F10 may be implemented by the sensor device SEN and a part of hardware such as the RAM 223 (see FIG. 12) of the controller 300.

In FIG. 8, an illustration is given of an example of a combination of respective detectors of the black liquid ejection head unit 210K and a cyan liquid ejection head unit 210C, among the detectors installed for respective liquid ejection head units. In this example, two of the sensor devices illustrated in FIG. 7 are used.

In this example, the surface detector 110F10 for the black liquid ejection head unit 210K outputs a detection result related to a "A position", and the surface detector 110F10 for the cyan liquid ejection head unit 210C outputs a detection result relating to a "B position".

Further, actuators A1 and A2 are configured to adjust positions in the width direction of the head units 210K and 210C, and a head unit correction amount calculator 330 is configured to transmit to the actuators A1 and A2, respective positional correction amounts ΔX1 and ΔX2, which are set in accordance with the detection results.

In FIG. 8, the surface detector 110F10 for the black liquid ejection head unit 210K includes, for example, an imaging unit (upstream side imaging unit) 16A, an imaging controller 14A, an image storage unit 15A, and the like. Note that in this example, the surface detector 110F10 for the cyan liquid ejection head unit 210C has the same configuration as the surface detector 110F10 for the black liquid ejection head unit 210K; hence, the surface detector 110F10 for the cyan liquid ejection head unit 210C, for example, includes the imaging unit 16B, the imaging controller 14B, an image storage unit 15B, and the like in a manner the same as the black liquid ejection head unit 210K. Hereinafter, an illustration is given of the surface detector 110F10 for the black liquid ejection head unit 210K as an example, and a duplicated description will be omitted.

As illustrated, the imaging unit 16A images a part of a web W that is transferred in the transfer direction X. The imaging unit 16A may, for example, be implemented by the CMOS image sensor 94 (see FIG. 7) in the detector.

The imaging controller 14A includes a shutter controller 141A and an image incorporating unit 142A. The imaging controller 14A is implemented by the FPGA 95 or the like in FIG. 7, for example.

The image incorporating unit 142A acquires an image (captured image) imaged by the imaging unit 16A. The shutter controller 141A controls timing at which the imaging unit 16A captures an image.

The image storage unit 15A stores an image incorporated by the imaging controller 14A. The image storage unit 15A is implemented by SRAM (Static RAM) or the like inside the FPGA 95, for example. Alternatively, the image storage unit 15A may be implemented by the RAM 223 (see FIG. 12) of the controller 300.

As a second moving amount detection method, the meandering amount calculator (calculator) 310 calculates relative positions of the pattern of the web W, and a moving speed at which the web W is transferred or the moving amount by which the web W is transferred between the two sets of image data, based on the respective image data stored in the image storage units 15A and 15B.

Further, the meandering amount calculator 310 outputs to the shutter controller 141A data of a time difference Δt indicating a timing of releasing a shutter. That is, shutter release timings of the imaging units 16A and 16B are controlled by the shutter controllers 141A and 141B such that the imaging units 16A and 16B capture an image at an "A position" and an image at a "B position" with the time difference Δt between the A position and B position. In addition, the meandering amount calculator 310 may control a motor or the like to cause the web W to be transferred at the calculated moving speed. Note that the meandering amount calculator 310 is implemented by, for example, the CPU 221 of the controller 300, another arithmetic device, or the like.

The web W is a member having scattering properties on the surface or inside of the web W. Thus, when the web W is irradiated with laser light, reflected light is diffuse-reflected. This diffuse reflection allows the web W to generate a pattern on the surface of the web W. That is, the pattern is a pattern called "speckle", a so-called speckle pattern. Thus, when an image of the web W is captured, an image indicating a speckle pattern is obtained. Since the position of the speckle pattern is identified from the captured image, it is possible to detect a predetermined position on the web W. Note that this speckle pattern is generated by interference of the irradiated laser light due to an uneven pattern (paper pattern) formed on the surface or inside of the web W.

Further, the light source is not limited to an apparatus using laser light. For example, the light source may be a LED (Light Emitting Diode) or organic EL (Electro-Luminescence) or the like. The pattern need not be a speckle pattern in accordance with the type of light source. The following illustrates an example where the pattern is a speckle pattern.

Thus, when the web W is transferred, the speckle pattern of the web W is transferred with the web W. Accordingly, when the same speckle pattern is detected by the two imaging units 16A and 16B at different times, the relative positions of the same speckle pattern between the two imaging units 16A and 16B are obtained.

That is, when the same speckle pattern is detected by the two imaging units 16A and 16B and the relative positions of the pattern are obtained, the meandering amount calculator 310 is enabled to obtain the moving amount of the web W in the orthogonal direction. When this obtained moving amount is converted into the transfer time of the web W between the two imaging units 16A and 16B, the meandering amount calculator 310 is enabled to obtain the moving speed at which the web W has moved in the orthogonal direction. Further, when the relative position of the pattern is obtained, the meandering amount calculator 310 is enabled to obtain the misalignment amount of the transfer position in the transfer direction of the web W.

More specifically, cross-correlation calculation is performed on the image data "D1(n)" and "D2(n)" indicating the respective images captured by the imaging unit 16A and the imaging unit 16B. Hereinafter, the image data generated by the cross-correlation calculation is referred to as "correlation image". For example, the image forming apparatus calculates the misalignment amount "ΔD(n)" based on the correlation image.

Further, the head unit correction amount calculator 330 sets the respective moving amounts (respective position correction amounts) ΔX1 and ΔX2 for moving the head units in a direction orthogonal to the transfer direction by using the misalignment amount "ΔD(n)" in the transfer direction acquired by the meandering amount calculator 310 and the sheet edge position data (ΔXE0) acquired by the edge sensor ES0.

Further, the ejection timing adjuster 350 calculates the amount of change in the ejection timing (timing in the transfer direction) of the head unit 210C based on the transfer speed calculated by the meandering amount calculator 310 to generate timing signals SIG1 and SIG2.

As described above, the detection results indicating the position of the web W may be obtained by one or more detectors using the speckle pattern. As a result, the image forming apparatus is enabled to improve the accuracy in detecting the position of the web in the direction orthogonal to the transfer direction.

Further, the correlation calculation in the first moving amount detection method using one sensor in the detector in FIG. 7 is performed, for example, as follows.

Correlation Calculation Example

FIG. 9 is a configuration diagram illustrating an example of a correlation calculation method according to an embodiment of the present invention. For example, the speckle pattern is acquired by the detector, and the correlation calculation is subsequently performed by the meandering amount calculator 310. By performing this correlation calculation, it is possible to output a detection result indicating the relative position of the web, the moving amount of the web, the moving speed of the web, or the combination thereof at the position of the sensor device.

Specifically, the meandering amount calculator 310 includes a first two-dimensional Fourier transform unit FT1, a second two-dimensional Fourier transform unit FT2, a correlation image data generator DMK, a peak position searching unit SR, a calculator CAL, and a transformation result storage unit MEM.

The first two-dimensional Fourier transform unit FT1 transforms the first image data D1. Specifically, the first two-dimensional Fourier transform unit FT1 includes an orthogonal direction Fourier transform unit FT1$a$ and a transfer direction Fourier transform unit FT1$b$.

The orthogonal direction Fourier transform unit FT1$a$ performs a one-dimensional Fourier transform on the first image data D1 in the orthogonal direction. Then, the transfer direction Fourier transform unit FT1$b$ performs a one-dimensional Fourier transform on the first image data D1 in the transfer direction, based on the transformation result obtained by the orthogonal direction Fourier transform unit FT1$a$. Accordingly, the orthogonal direction Fourier transform unit FT1$a$ and the transfer direction Fourier transform unit FT1$b$ perform one-dimensional Fourier transforms in the orthogonal direction and the transfer direction, respectively. The first two-dimensional Fourier transform unit FT1 outputs thus obtained transformation result to the correlation image data generator DMK.

Similarly, the second two-dimensional Fourier transform unit FT2 transforms the second image data D2. Specifically, the second two-dimensional Fourier transform unit FT2 includes an orthogonal direction Fourier transform unit FT2$a$, a transfer direction Fourier transform unit FT2$b$, and a complex conjugate unit FT2$c$.

The orthogonal direction Fourier transform unit FT2$a$ performs a one-dimensional Fourier transform on the second image data D2 in the orthogonal direction. Then, the transfer direction Fourier transform unit FT2$b$ performs a one-dimensional Fourier transform on the second image data D2 in the transfer direction, based on the transformation result obtained by the orthogonal direction Fourier transform unit FT2$a$. Accordingly, the orthogonal direction Fourier transform unit FT2$a$ and the transfer direction Fourier transform unit FT2$b$ perform one-dimensional Fourier transforms in the orthogonal direction and the transfer direction, respectively.

Next, the complex conjugate unit FT2$c$ calculates the complex conjugate of the transformation results obtained by the orthogonal direction Fourier transform unit FT2$a$ and the transfer direction Fourier transform unit FT2$b$. Then, the second two-dimensional Fourier transform unit FT2 outputs the complex conjugate calculated by the complex conjugate unit FT2$c$ to the correlation image data generator DMK.

Subsequently, the correlation image data generator DMK generates correlation image data, based on the transformation result of the first image data D1 output from the first two-dimensional Fourier transform unit FT1 and the transformation result of the second image data D2 output from the second two-dimensional Fourier transform unit FT2.

The correlation image data generator DMK includes an integrator DMK$a$ and a two-dimensional inverse Fourier transform unit DMK$b$.

The integrator DMK$a$ integrates the transformation result of the first image data D1 and the transformation result of the second image data D2. The integrator DMK$a$ then outputs the integration result to the two-dimensional inverse Fourier transform unit DMK$b$.

The two-dimensional inverse Fourier transform unit DMK$b$ performs a two-dimensional inverse Fourier transform on the integration result obtained by the integrator DMK$a$. As described above, when the two-dimensional inverse Fourier transform is performed, correlation image data is generated. Then, the two-dimensional inverse Fourier transform unit DMK$b$ outputs correlation image data to the peak position searching unit SR.

The peak position searching unit SR searches for a peak position having peak luminance (peak value) that is the steepest in the generated correlation image data (i.e., the rise becomes steep). First, a value indicating the intensity of light, that is, magnitude of luminance is input to the correlation image data. In addition, luminance is input in a matrix.

In the correlation image data, luminance is arranged at pixel pitch intervals of an area sensor, that is, at the pixel size intervals. Thus, it is preferable that the search for the peak position is performed after so-called sub-pixel processing is performed. As illustrated above, when the sub-pixel processing is performed, the peak position may be searched for with high accuracy. Accordingly, the meandering amount calculator 310 is enabled to accurately output the position, the moving amount, the moving speed, and the like.

For example, the search by the peak position searching unit SR is performed as illustrated in FIG. 10.

FIG. 10 is a diagram illustrating an example of a peak position searching method in the correlation calculation according to an embodiment of the present invention. In FIG. 10, the horizontal axis indicates a position in the transfer direction in an image indicated by correlation image data, and the vertical axis indicates a luminance of the image indicated by the correlation image data.

Hereinafter, the following illustration is given of examples of three data of the first data value q1, the second data value q2, and the third data value q3, among the luminances indicated by the correlation image data. That is, in this example, the peak position searching unit SR (see FIG. 9) searches for the peak position P on the curve k connecting the first data value q1, the second data value q2, and the third data value q3.

First, the peak position searching unit SR calculates each difference in luminance of the image indicated by the correlation image data. Then, the peak position searching unit SR extracts a combination of data values having the largest difference value among the calculated differences. Next, the peak position searching unit SR extract respective data value combinations adjacent to the combination of data values having the largest difference value. In this manner, the peak position searching unit SR is enabled to extract three data, such as the first data value q1, the second data value q2, and the third data value q3 illustrated in FIG. 10.

Then, when the curve k is calculated by connecting the three extracted data, the peak position searching unit SR is enabled to search for the peak position P. In this manner, the peak position searching unit SR may reduce the amount of calculation such as a subpixel process and may search for the peak position P at higher speed. Note that the position at which the combination of data values has the largest difference value is the steepest position. In addition, the subpixel process may be a process other than the above process.

As described above, when the peak position searching unit SR searches for the peak position, for example, a calculation result as illustrated in FIG. 11 is obtained.

FIG. 11 is a diagram illustrating calculation result examples of the correlation calculation according to an embodiment of the present invention. FIG. 11 is a diagram illustrating a correlation strength distribution of a cross-correlation function. In this figure, the X axis and the Y axis indicate serial numbers of pixels. A peak position like the "correlation peak" indicated in FIG. 11 is searched for by the peak position searching unit SR (see FIG. 9).

Returning back to FIG. 9, the calculator CAL calculates a relative position, moving amount, moving speed, or the like of the web W. For example, when calculating the difference between the center position of the correlation image data and the peak position detected by the peak position searching unit SR, the calculator CAL is enabled to calculate a relative position and a moving amount of the web W.

Further, based on the relative position obtained, the calculator CAL is enabled to calculate a moving speed of the web W.

As described above, the meandering amount calculator 310 is enabled to detect a relative position, a moving amount, a moving speed, or the like of the web W by correlation calculation. Note that the method of detecting a relative position, a moving amount, a moving speed, or the like of the web is not limited to this example. For example, the meandering amount calculator 310 may detect a relative position, a moving amount, a moving speed, or the like of the web W by another detection calculation noted below.

Another Detection Calculation Example

First, the meandering calculator 310 binarizes the luminance of each of the first image data D1 and the second image data D2. That is, the meandering amount calculator 310 sets "0" when the luminance is equal to or less than a preset threshold value, and sets "1" when the luminance is a value greater than the threshold value. By comparing the binarized first image data and the second image data in this manner, the meandering amount calculator 310 may detect the relative position of the web.

Note that FIG. 9 illustrates an example where fluctuation is present in the Y direction (width direction); however, when fluctuation is present in the X direction (transfer direction), the peak position appears at a position that is also shifted in the X direction.

In addition, the meandering amount calculator 310 may detect a relative position, moving amount, moving speed, or the like of the web by detection methods other than the above-described detection method. For example, the meandering amount calculator 310 may detect a relative position of the web from a pattern captured in each of the image data by a so-called pattern matching process or the like.

Note that setting of a relative position detection range for detecting a speckle pattern in the detector is described in detail in Japanese Patent Application No. 2017-027481.

Head Position Movement Configuration

FIG. 12 is a block diagram illustrating an example of a hardware configuration for moving the liquid ejection head units included in the liquid ejection apparatus according to an embodiment of the present invention. The configuration illustrated in FIG. 12 is an example in which the image forming apparatus 110 includes two or more actuators and two or more sensors. Further, according to the configuration illustrated in FIG. 12, the image forming apparatus 110 includes a controller (CTRL, control device, control unit) 300, and an image forming engine 400. Note that in this example, the controller 300 is disposed inside the image forming apparatus 110; however, the controller 300 may be an external apparatus as described in a second embodiment.

The controller 300 illustrated in FIG. 12 includes a CPU (Central Processing Unit) 221, a ROM (Read-Only Memory) 222, and a RAM (Random Access Memory) 223. Further, as illustrated in FIG. 12, each device may have an interface to be an I/O (Input/Output) 225 in order to transmit and receive data and the like with other devices.

Note that the hardware configuration is not limited to the illustrated example. That is, each of the illustrated devices may be included in the image forming apparatus or may be an external device.

Further, each of the illustrated devices may be shared or may be separately provided. For example, the CPU 221 or the like may also be used for implementing the meandering amount calculator 310, or the CPU 221 or the like may be separately provided from a CPU or the like for implementing the meandering amount calculator 310.

The CPU 221 is an example of an arithmetic device and a control unit. Specifically, the CPU 221 acquires the detection results of the respective sensors and performs calculations and the like to calculate the amount of change of an object to be transferred. Further, the CPU 221 controls each actuator and performs control and the like for moving each head unit.

The ROM 222 and the RAM 223 are examples of a storage device. For example, the ROM 222 stores programs, data, and the like used by the CPU 221. In addition, the RAM 223 stores programs and the like used for the CPU 221 to perform calculations, and is a storage area for implementing each operation.

A speed detection circuit SCR is an electronic circuit configured to detect a moving speed or the like at which an object to be transferred is detected. For example, a "6 ppi" signal or the like is input to the speed detection circuit SCR. Next, the speed detection circuit SCR calculates a speed at which an object to be transferred is transferred based on a detection result from each sensor, a detection result from an encoder, or the like, and transmits the calculated result to the CPU 221 or the like. Note that the speed detection circuit SCR may be implemented by the FPGA 95 illustrated in FIG. 7 or may be different from the FPGA.

The above-described edge sensor ES0, the sensor devices (surface detection sensors) SE1, SE2, SE3 and SE4 of respective colors and the upstream sensor device SE0 are connected to the controller 300 via a bus 224.

A detection result obtained by each sensor is transmitted to the controller (control device) 300 via a corresponding input/output interface (I/O) and the bus 224. Specifically, the upstream position output sensor device SE0 is connected to the controller 300. Further, per-head unit sensor devices SEN1 are each connected to the controller 300. Note that the per-head unit sensor devices SEN1 in this example indicate a black sensor device SE1, a cyan sensor device SE2, a magenta sensor device SE3 and an yellow sensor device SE4.

Further, the detection result obtained by an edge sensor ES0 is also transmitted to the controller 300.

In the image forming engine 400, the actuators A1 to A4 connected to the controller 300 via the bus 224 are connected to the respective liquid ejection head units 210 to be moved. Specifically, the first actuator A1 is connected to the black liquid ejection head unit 210K to move the black liquid ejection head unit 210K in a direction orthogonal (orthogonal direction) to a transfer direction of the web.

Similarly, the second actuator A2 is connected to the cyan liquid ejection head unit 210C to move the cyan liquid ejection head unit 210C in a direction orthogonal (orthogonal direction) to the transfer direction of the web. Likewise, the third actuator A3 is connected to the magenta liquid ejection head unit 210M to move the magenta liquid ejection head unit 210M in a direction orthogonal (orthogonal direction) to the transfer direction of the web. Further, the fourth actuator A4 is connected to the yellow liquid ejection head unit 210Y to move the yellow liquid ejection head unit 210Y in a direction orthogonal (orthogonal direction) to the transfer direction of the web.

Each of the actuators moves a corresponding one of the liquid ejection head units, for example, by a moving mechanism as illustrated in FIG. 13.

FIG. 13 is a schematic top diagram illustrating an example of a moving mechanism for moving a liquid ejection head unit included in a liquid ejection apparatus according to an embodiment of the present invention. For example, the moving mechanism is achieved by hardware or the like illustrated in FIG. 13. The illustrated example is an example of a moving mechanism configured to move the cyan liquid ejection head unit 210C.

In the example of FIG. 13, first, an actuator (second actuator A2) such as a linear actuator configured to move the cyan liquid ejection head unit 210C is installed in the cyan liquid ejection head unit 210C. The controller (control device) 300 configured to control an actuator is connected to the actuator A2.

The actuator A2 is, for example, a linear actuator or a motor. The actuator A2 may also include a control circuit, a power supply circuit, mechanical parts, and the like.

A detection result obtained by using a set detection range is input to the controller 300. The controller 300 then moves the cyan liquid ejection head unit 210C by the second actuator A2 so as to compensate for fluctuation in the position of the web W indicated by the detection result.

In the example of FIG. 13, the positional correction amount calculated from the detection result is, for example, fluctuation A. Thus, in this example, the controller 300 has moved the cyan liquid ejection head unit 210C by the actuator A2 in the orthogonal direction (the direction indicated by an arrow B) so as to compensate for the fluctuation A.

COMPARATIVE EXAMPLE

FIG. 14 is a top view diagram of a liquid ejection apparatus according to a comparative example. The configuration of the comparative example illustrated in FIG. 14 does not include the edge sensor ES0, which differs from the configuration in FIG. 2 described above.

In this comparative example, drive amounts of respective actuators are indicated to move positions of the head units 210 in order to adjust relative positions of respective colors using the sheet meandering amount calculated based on the positions detected from the multiple sensor devices SE0 to SE4.

FIG. 15 is a timing chart illustrating an example of a method for calculating a fluctuation amount (meandering amount) of an object to be transferred by a liquid ejection apparatus according to the comparative example illustrated in FIG. 14. The control device of the comparative example calculates a fluctuation amount based on the detection results using two or more fourth detection ranges. Specifically, based on the two types of acquired data output from the two sensors, the control device outputs a calculation result indicating the fluctuation amount.

First, the sensor devices SE0 and SE2 acquire surface information. The acquired data illustrated in the upper part is the upstream detection result output from the upstream position output sensor device SE0 and the acquired data illustrated in the lower part is the downstream detection result output from the position output sensor device SE1.

Subsequently, each of the acquired data is transmitted to the control device, and the detection results are thus stored in the RAM 223. Subsequently, the control device calculates the fluctuation amount from the detection results indicated by the acquired data.

The fluctuation amount is calculated for each liquid ejection head unit. The following illustrates an example of calculating the fluctuation amount for the most upstream black liquid ejection head unit 210K. In this example, the fluctuation amount is calculated based on, for example, the detection result obtained by the upstream sensor device SE0 and the detection result obtained by the black sensor device SE1.

In this example, it is assumed that an interval between the upstream sensor device SE0 and the black sensor device SE1, that is, the distance between the sensors is "L2". Further, it is assumed that the moving speed detected by the speed detection circuit SCR is "V". In addition, it is assumed that the moving time taken for an object to be transferred from the position of the upstream sensor device SE0 to the position of the black sensor device SE1 is "T2". In this case, the moving time is calculated as "T2=L2/V".

Further, it is assumed that a sampling interval by a sensor is "A". Further, it is assumed that the number of sampling times between the upstream sensor device SE0 and the black sensor device SE1 is "n". In this case, the number of sampling times calculated is "n=T2/A".

It is assumed that the illustrated calculation result, that is, the fluctuation amount is "ΔX". For example, as illustrated in FIG. 15, when a detection period is "0", the fluctuation amount is calculated by comparing the first detection result S1 before the moving time "T2" and the second detection result S2 at the detection period "0". Specifically, the fluctuation amount is calculated as "ΔX=X2(0)−X1(n)". When the position of the sensor is closer to the first roller than is the landing position, the image forming apparatus calculates fluctuation in the position of the recording medium for any shift in the recording medium (sheet) as far as the position of the sensor device to drive, the actuator.

Next, the image forming apparatus controls the first actuator A1 to move the black liquid ejection head unit 210K in the orthogonal direction so as to compensate for the fluctuation amount "ΔX". In this manner, even when the position of the object to be transferred fluctuates, the image forming apparatus may be enabled to form an image with high precision on the object to be transferred.

As illustrated in the figure, when the fluctuation amount is calculated based on the two detection results, that is, the detection results obtained by the two sensor devices, the fluctuation amount may be calculated without integrating the detection results of the sensor devices. Thus, when the fluctuation amount is calculated based on the two detection results in this manner, the cumulative detection error added by each sensor may be reduced.

Note that the calculation of the fluctuation amount may be similarly performed in other liquid ejection head units. For example, the fluctuation amount for the cyan liquid ejection head unit 210C is calculated based on two detection results obtained by the black sensor device SE1 and the cyan sensor device SE2.

Similarly, the fluctuation amount for the magenta liquid ejection head unit 210M is calculated based on two detection results obtained by the cyan sensor device SE2 and the magenta sensor device SE3. Further, the fluctuation amount for the yellow liquid ejection head unit 210Y is calculated based on two detection results obtained by the magenta sensor device SE3 and the yellow sensor device SE4.

The detection result used as the upstream detection result is not limited to the detection result detected by a sensor installed immediately upstream from the liquid ejection head unit to be moved. That is, the upstream detection result may be a detection result detected by any sensor installed upstream of the liquid ejection head unit to be moved. For example, the fluctuation amount for the yellow liquid ejection head unit 210Y may also be calculated by using the detection result obtained by any one of the upstream sensor device SE0, the black sensor device SE1 or the cyan sensor device SE2 as the upstream detection result.

By contrast, it is preferable that the downstream detection result is a detection result obtained by a sensor installed at a position closest to the liquid ejection head unit to be moved.

Further, the fluctuation amount of the web (meandering amount in the width direction) may be calculated based on three or more detection results.

As described above, the liquid ejection head unit may be moved based on the fluctuation amount calculated from two or more detection results and liquid is ejected onto the web to form an image or the like on the recording medium.

In the comparative example, meandering in the width direction is calculated using two or more detection results. Hence, the head units are moved by the respective actuators so as to compensate for the fluctuation amount of the web. That is, the landing positions of the liquid droplets ejected from the respective nozzles of the heads of the head units on the sheet may be aligned in line with one another in the width direction.

However, when the position in the width direction of the sheet at the sensor position upstream of the head unit 210K is shifted from the reference, the write start position in the sheet width direction is misaligned, thereby deteriorating printing quality.

Head Position Control of the Present Invention

Compared with the above comparative example, according to the embodiment of the present invention, the sheet meandering amount compensation is combined with positional fluctuation compensation with respect to the absolute reference position using the sheet edge shift amount so as to move the head units (write position correction) as an image printing position adjustment.

Note that the reading timing of the edge misalignment may be performed only at the time of the initial adjustment or may be performed in real time.

In the following, a method of correcting an image printing position in a case of reading the edge misalignment at the initial adjustment is described with reference to FIGS. 15 and 16, and a method of correcting an image printing position when reading the edge misalignment in real time is described with reference to FIGS. 17 and 18.

Position Correction at Initial Adjustment

The following illustrates image printing position correction in a case of reading sheet edge misalignment at initial adjustment according to an embodiment of the present invention. FIG. 16 is a diagram illustrating an example of a method for correcting an image printing position in a case of reading an edge misalignment at initial adjustment according to an embodiment of the present invention.

In FIG. 16, first, for an initial adjustment before printing, a sheet is transferred to acquire sheet edge position data ($\Delta XE0$). The sheet edge position data is temporarily stored in the data storage device (e.g., a RAM 223 in FIG. 12) for use in later-described writing position correction.

The sensor devices SE0 to SE4 illustrated in FIG. 2 constantly incorporate image data while the sheet is transferred at printing.

In this adjustment, a sheet edge misalignment amount is calculated from the sheet edge position data acquired at the initial adjustment, in addition to a sheet meandering amount calculated from the acquired data acquired via sensor devices immediately below head units 210 and a sensor device upstream of the head units 210 in the same manner as in FIG. 15. Then, image printing position correction is performed by relative positional correction of respective colors based on calculation of the sheet meandering amount and writing position correction based on calculation of the sheet edge misalignment amount.

As an example, a method for calculating a correction amount of an image printing position in the most upstream head unit 210K will be described with reference to FIG. 16.

In FIG. 16, the meandering amount $\Delta X1(0)$ at the position of the black sensor device SE1 at a sampling period 0 is calculated based on a comparison between a detection result of the upstream sensor device SE0 obtained at a preceding sheet transfer time and a detection result of the black sensor device SE1.

$$\Delta X1(0)=X1(0)-X0(-n) \tag{1}$$

Further, the sheet edge misalignment amount $\Delta XE0$ is calculated based on a comparison between sheet edge position data acquired at the initial adjustment and the reference position.

Then, the image printing position correction amount $\Delta X$ is calculated by adding the sheet edge misalignment amount $\Delta XE0$ and the meandering amount $\Delta X1(0)$.

$$\Delta X(0)=\Delta X1(0)+\Delta XE0=X1(0)-X0(-n)+XE0 \tag{2}$$

As described above, the image printing position correction is performed using two data that are the sheet meandering amount $\Delta X1(0)$ and the sheet edge misalignment amount $\Delta XE0$.

Similarly, the head unit 210C calculates the sheet meandering amount during printing using the black sensor device SE1 and the cyan sensor device SE2. The head unit 210M calculates the sheet meandering amount during printing using the cyan sensor device SE2 and the magenta sensor device SE3. The head unit 210Y calculates the sheet meandering amount during printing using the magenta sensor device SE3 and the yellow sensor device SE4.

In this manner, the moving amount of the head unit is calculated as the correction amount of the image printing position using the sheet edge misalignment amount ΔXE0 at the initial adjustment and the sheet meandering amount that changes in real time.

In this case, as illustrated in FIG. 2, the upstream sensor device SE0 that outputs the most upstream detection result and the edge sensor ES0 are arranged at the same position in the width direction, which is a direction orthogonal (orthogonal direction) to the transfer direction. Thus, it is possible to detect the misalignment amount of the detection position of the speckle pattern at the position of the upstream sensor device SE0 with respect to the reference position.

In this manner, it is possible to compensate for absolute positional misalignment with respect to amount of change (meandering amount), which is calculated by the head unit 210K directly using the upstream sensor device SE0, or which is calculated by each of the head units 210C, 210M and 210Y indirectly using the upstream sensor device SE0.

The following illustrates operations of correcting an image printing position in a case of reading the sheet edge misalignment at the initial adjustment. FIG. 17 is a diagram illustrating an example of a method for correcting an image printing position in a case of reading the sheet edge misalignment at the initial adjustment.

First, when the image forming apparatus, which is an example of a transfer apparatus, is activated by START, the controller 300 determines whether to execute an initial adjustment mode in step S101.

Subsequently, when executing the initial adjustment mode (Yes in S101), the controller 300 starts transferring the sheet (step S102), and the position of the edge of the sheet being transferred is then detected by the edge sensor ES0. The edge misalignment amount calculator 320 calculates the edge misalignment amount by comparing the detected edge position of the sheet with the reference position (step S103).

When the detection of the edge position and the calculation of the misalignment amount are completed, the controller 300 ends transferring the sheet (step S104), and ends the initial adjustment mode (step S105).

Upon ending the initial adjustment mode, the controller 300 starts printing and starts transferring the sheet again (step S106).

Note that in a case of the initial adjustment mode being unnecessary, the controller 300 does not perform operations from S102 to S105, and starts operations from S106. For example, in a case of forming the same image using the same type of sheet immediately after the end of the previous printing, the edge position also tends to remain the same as the position at the end of the previous printing. Therefore, the previously calculated edge misalignment amount may also be applied to the current printing by omitting the calculation of the edge misalignment amount by using the edge sensor in the initial adjustment mode at the time of activation.

When the printing operation is started and the sheet transfer is started, the meandering amount calculator 310 (see FIG. 6) detects the meandering amount of the transferred sheet based on the acquired data acquired via the multiple sensor devices SE0 to SE4 (Step S107).

In step S108, the head unit correction amount calculator 330 calculates the correction amount of the image printing position from the sheet edge misalignment amount acquired in the initial adjustment mode and the sheet meandering amount acquired during printing.

Then, the actuator drive instruction unit 340 indicates the actuator AC to perform a position moving operation of the head unit 210 based on the calculated correction amount of the image printing position (step S109).

In this adjustment, the detection of the sheet meandering amount, the calculation of the image printing position correction amount, and the correction operation are repeatedly performed in steps S107 to S109, until the printing ends (Yes in step S110).

In this adjustment, since the sheet edge misalignment amount is calculated only at the initial adjustment, only the sheet meandering amount needs to be calculated during printing. Thus, the position adjustments of the head units may be performed with high accuracy while minimizing the load on the controller (e.g., the CPU 221 (see FIG. 12)).

Real Time Position Correction

The following illustrates an image printing position correction in a case of reading sheet edge misalignment in real time according to an embodiment of the present invention. FIG. 18 is a diagram illustrating an example of a method for correcting an image printing position in a case of reading the edge misalignment in real time according to the present invention.

In this adjustment, during transferring of a sheet at printing, the sensor devices SE0 to SE4 constantly incorporate image data, and the edge sensor ES0 constantly incorporates sheet edge position data. Specifically, during transferring of a sheet, i.e., during printing, a sheet meandering amount is calculated based on acquired data acquired from the sensor devices immediately below the respective head units and acquired from a sensor upstream of these sensor devices, and the sheet edge misalignment amount is calculated based on the sheet edge position data. Subsequently, image printing position correction is performed based on relative positional correction of respective colors obtained by calculating the sheet meandering amount and based on writing position correction obtained by calculating the sheet edge misalignment amount.

As an example, a method for calculating a correction amount of an image printing position in the head unit 210K will be described with reference to FIG. 18. In the upper part of FIG. 18, the meandering amount $\Delta X1(0)$ at the position of the black sensor device SE1 at the sampling period 0 is calculated based on a comparison between the detection result of the upstream sensor device SE0 at a preceding sheet transfer time and the detection result of the black sensor device SE1, in a manner similar to the formula (1).

$$\Delta X1(0)=X1(0)-X0(-n) \tag{3}$$

Further, in this adjustment, the sheet edge misalignment amount $\Delta XE0(-n)$ is calculated at the same timing as calculation of the acquired data $X0(-n)$ of the sensor device SE0.

Then, in a manner similar to the formula (2), the image printing position correction amount $\Delta X$ is calculated by combining the meandering amount $\Delta X1(0)$ and the sheet edge misalignment amount $\Delta XE0(0)$ that are calculated at the same timing.

$$\Delta X(0)=\Delta X1(0)+\Delta XE0(-n)=X1(0)-X0(-n)+\Delta XE0(-n) \tag{4}$$

Accordingly, the image printing position correction is performed in real time using two data that are the sheet meandering amount and the sheet edge misalignment amount.

Similarly, the head unit 210C uses the sensor devices SE1 and SE2, the head unit 210M uses the sensor devices SE2 and SE3, and the head unit 210Y uses the sensor devices SE3 and SE4 so as to calculate the sheet meandering amount during printing and calculate correction amount of the image printing position based on the sheet edge misalignment amount during printing.

Further, the sheet edge misalignment amount may be calculated by obtaining the mean (average) of the latest acquired data by a moving average, or excluding acquired data having noise using a filter. Calculating the data in this manner makes it possible to avoid an adverse effect of sheet edge chipping and noise at the timing of sensors' sampling data during printing. Thus, the accurate image printing position may be obtained.

The following illustrates operations of the image printing position correction in a case of reading sheet edge misalignment in real time. FIG. 19 is a flowchart illustrating an example of a method for correcting a writing position in the sheet width direction in a case of reading sheet edge misalignment in real time according to the present invention.

First, when the image forming apparatus, which is an example of a transfer apparatus, is started by START, in step S101, transfer of the sheet is started simultaneously with the start of printing (step S201).

When the sheet starts to be transferred, the meandering amount calculator 310 (see FIG. 6) detects the sheet meandering amount of the transferred sheet based on the acquired data acquired via the multiple sensor devices SE0 to SE4 (Step S107).

Simultaneously with S202, the edge sensor ES0 acquires the edge position of the sheet and detects the sheet edge misalignment amount based on the acquired data (step S203).

In step S204, the head unit correction amount calculator 330 calculates the correction amount of the image printing position from the sheet meandering amount and the sheet edge misalignment amount acquired during printing.

Then, the actuator drive instruction unit 340 indicates the actuator AC to perform a position moving operation of the head unit 210 based on the calculated correction amount of the image printing position (step S205).

Until the printing ends (Yes in step S206), the meandering amount detection, the sheet edge misalignment amount detection, and the image printing position correction amount calculation and correction operation based on the meandering amount and the sheet edge misalignment amount in steps S202 to S205 are repeatedly performed.

In this control, image printing position correction is performed in real time at a predetermined period during printing. Hence, even when sheet edge misalignment occurs during printing, the positions of the head units may be constantly adjusted. Accordingly, more precise position adjustment may be achieved. According to this positional adjustment, a higher quality image may be printed.

Second Embodiment: System

FIG. 20 is a schematic top diagram illustrating an example of a system provided with a transfer apparatus according to a second embodiment of the present invention. In the first embodiment, the transfer apparatus is described as an independent image forming apparatus; however, the image forming apparatus may be one apparatus within the image forming system 10.

As illustrated in FIG. 20, the image forming system 10 includes a first image forming apparatus 110, a second image forming apparatus 120, a sheet feeding apparatus 130, a treatment agent coating apparatus 140, and a reversing apparatus 150.

The first image forming apparatus 110 and the second image forming apparatus 120 in FIG. 20 are examples of liquid ejection apparatuses each configured to eject ink droplets to form an image on a web W. In the following description, the first image forming apparatus 110 and the second image forming apparatus 120 having the same configuration may be described as "image forming apparatus 110" as in the first embodiment.

The sheet feeding apparatus 130 supplies a web W as an object to be transferred to the treatment agent coating apparatus 140. The web W is long continuous paper, which is wound in a roll shape and stored in the sheet feeding apparatus 130. The web W is fed from the sheet feeding apparatus 130 to the treatment agent coating apparatus 140 by a supply roller or the like. The treatment agent coating apparatus 140 applies a treatment agent to both surfaces of the web W while transferring the web W toward the first image forming apparatus 110.

The first image forming apparatus 110 ejects ink droplets from a recording head based on input image data and forms an image on a first surface of the web W, which has both surfaces coated with the treatment agent in the treatment agent coating apparatus 140.

The web W discharged from the first image forming apparatus 110 with an image formed on the first surface is reversed by the reversing apparatus 150 and supplied to the second image forming apparatus 120.

The second image forming apparatus 120 ejects ink droplets from a recording head based on input image data and forms an image on the second surface of the web W, which has the image already formed on the first surface.

The image forming system 10 has the above-described configuration, and forms images on both surfaces of a web W, which is long continuous paper. The image forming system 10 may include a cutting device configured to cut the web W discharged from the second image forming apparatus 120, a post-treatment apparatus configured to perform post-treatment on the cut web W, and the like.

Control Block

Next, a control configuration in the image forming system 10 according to the present embodiment will be described. FIG. 21 is a block diagram illustrating an example of a hardware configuration of a controller according to an embodiment of the present invention.

For example, in the present embodiment, a controller 300 illustrated in FIG. 3 may be executed by a host apparatus 71 such as an information processing apparatus or the like, and a printer apparatus 72. In the example illustrated in FIG. 3, the controller 300 causes the printer apparatus 72 to form an image on a recording medium based on the image data and control data input from the host apparatus 71.

The host apparatus 71 may, for example, be a PC (Personal Computer) or the like. Further, the printer apparatus 72 includes a printer controller 72C and a printer engine 72E.

The printer controller 72C controls operations of the printer engine 72E. First, the printer controller 72C transmits and receives control data to and from the host apparatus 71 via a control line 70LC. Further, the printer controller 72C transmits and receives control data to and from the printer engine 72E via a control line 72LC. Various printing conditions and the like indicated by the control data are input to the printer controller 72C by transmission and reception of this control data, and the printer controller 72C stores print conditions and the like by a register or the like. Next, the printer controller 72C controls the printer engine 72E based on the control data and performs image formation according to print job data, that is, the control data.

The printer controller 72C includes a CPU 72Cp, a print control device 72Cc, and a storage device 72Cm. Note that the CPU 72Cp and the print control device 72Cc are connected by a bus 72Cb to mutually communicate with each other. Further, the bus 72Cb is connected to the control line 70LC via a communication I/F (interface) or the like.

The CPU 72Cp controls operations of the entire printer apparatus 72 by a control program or the like. That is, the CPU 72Cp is an arithmetic device and a control device.

The print control device 72Cc transmits to and receives from the printer engine 72E data indicating a command, a status, or the like. As a result, the print control device 72Cc controls the printer engine 72E. Further, the image storage units 15A and 15B illustrated in FIG. 8 of the first embodiment and a transform result storage unit MEM illustrated in FIG. 9 may be implemented by, for example, the storage device 72Cm of the system or the like. The meandering amount calculator 310 illustrated in FIG. 8 is implemented by, for example, the CPU 72Cp or the like. The image storage units 15A and 15B and the transform result storage unit MEM are implemented by, for example, the storage device 72Cm of the printer controller 72C, the storage devices 72ECm, 72EMm, 72EYm and 72EKm of the data management devices 72EC, 72EM, 72EY and 72EK, or may be implemented by other arithmetic devices or the like.

The data lines 70LD-C, 70LD-M, 70LD-Y and 70LD-K, that is, multiple data lines are connected to the printer engine 72E. The printer engine 72E receives image data from the host apparatus 71 via the data lines. Next, the printer engine 72E forms an image of each color under the control of the printer controller 72C.

The printer engine 72E has data management devices 72EC, 72EM, 72EY and 72EK, that is, multiple data management devices. The printer engine 72E further includes an image output device 72Ei and a transfer control device 72Ec.

FIG. 22 is a block diagram illustrating an example of a hardware configuration of a data management device included in the controller according to the embodiment of the present invention. For example, the multiple data management devices have the same configurations. The following illustrates an example in which multiple data management devices have the same configurations, with reference to a typical example of the data management device 72EC. Thus, duplicated illustration of the multiple data management devices will be omitted.

The data management device 72EC has a logic circuit 72EC1 and a storage device 72ECm. As illustrated in FIG. 22, the logic circuit 72EC1 is connected to the host apparatus 71 via a data line 70LD-C. Further, the logic circuit 72EC1 is connected to the print control device 72Cc via the control line 72LC. Note that the logic circuit 72EC1 is implemented by an ASIC (Application Specific Integrated Circuit), a PLD (Programmable Logic Device), or the like.

For example, the data management device 72EC may perform, for example, the function of the controller (control unit) 300 illustrated in FIG. 5 to operate actuators AC configured to move positions of the head units 210K, 210C, 210M, and 210Y in the width direction.

The logic circuit 72EC1 stores image data input from the host apparatus 71 in the storage device 72ECm, based on a control signal input from the printer controller 72C (FIG. 21).

In addition, the logic circuit 72EC1 reads cyan image data Ic from the storage device 72ECm based on a control signal input from the printer controller 72C. Next, the logic circuit 72EC1 sends the read cyan image data Ic to the image output device 72Ei.

Note that it is preferable that the storage device 72ECm has a capacity capable of storing image data of approximately three pages. When the storage device 72ECm has a capacity of storing image data of approximately 3 pages, the storage device 72ECm may store image data input from the host apparatus 71, image data currently being formed, and image data for forming a next image.

FIG. 23 is a block diagram illustrating an example of a hardware configuration of an image output device included in the controller according to the embodiment of the present invention. As illustrated in FIG. 23, the image output device 72Ei includes an output control device 72Eic, and liquid ejection head units of respective colors, which are a black liquid ejection head unit 210K, a cyan liquid ejection head unit 210C, a magenta liquid ejection head unit 210M, and a yellow liquid ejection head unit 210Y.

The output control device 72Eic outputs image data of respective colors to the liquid ejection head units of respective colors. That is, the output control device 72Eic controls the liquid ejection head units of the respective colors based on the input image data.

The output control device 72Eic controls the multiple liquid ejection head units simultaneously or individually. That is, the output control device 72Eic performs control, upon reception of timing input, to change a timing of causing each liquid ejection head unit to eject a liquid. Note that the output control device 72Eic may control any of the liquid ejection head units based on a control signal input from the printer controller 72C (FIG. 21). Further, the output control device 72Eic may control any of the liquid ejection head units based on an operation by a user or the like.

Note that the printer apparatus 72 illustrated in FIG. 21 is an example having different routes as a path for inputting image data from the host apparatus 71 and as a path used for transmission and reception between the host apparatus 71 and the printer apparatus 72 based on the control data.

The printer apparatus 72 may be configured to form an image with, for example, one black color. In the case of forming an image with one black color, the printer apparatus 72 may have a configuration having one data management device and four black liquid ejection head units in order to increase the speed of forming an image. In such a configuration, the black ink is ejected by each of the four black liquid ejection head units. Accordingly, the printer apparatus 72 having such a configuration may be enabled to form an image at a higher speed, compared to the configuration having one black liquid ejection head unit.

The transfer control device 72Ec (FIG. 21) is a motor or the like configured to transfer a web W or the like. For example, the transfer control device 72Ec controls a motor or the like connected to each of the rollers to transfer the web W.

Third Embodiment: Reading Apparatus

FIG. 24 is a schematic top diagram illustrating a configuration example of a reading apparatus according to a third embodiment of the present invention. In the first embodiment and the second embodiment described above, an illustration is given of an example in which each of the head units included in the transfer apparatus is a liquid ejection head unit configured to eject liquid, and the transfer apparatus is a liquid ejection apparatus; however, the head unit may be a reading unit (a scanner). In this case, the transfer apparatus functions as a reading apparatus (inspection apparatus) configured to perform reading.

The transfer apparatus 1 may perform a reading process on the transferred web W by the respective head units at different positions on a transferred path. Hereinafter, according to the present embodiment, an illustration is given of an example in which the head units HD1 and HD2 are reading units having reading heads CIS1 and CIS2 each including an assembly of CISs (Contact Image Sensors). In the present embodiment, the reading position at which a process is performed by each of the reading heads CIS1 and CIS2 is a processing position.

The head unit is configured to include one or more reading heads installed along directions orthogonal (orthogonal directions) to the transfer direction X. For example, as illustrated in FIG. 24, the transfer apparatus 1 has two head units, namely, a head unit HD1 and a head unit HD2. Note that in this example, a configuration of the transfer apparatus 1 having two head units will be described; however, the number of head units included in the transfer apparatus 1 is not limited to two, and the number of head units included in the transfer apparatus 1 may be three or more.

As illustrated in FIG. 24, the head unit HD1 and the head unit HD2 respectively include one or more reading heads CIS1 and CIS2. In FIG. 24, one CIS head is provided in each head unit HD; however, the head unit HD1 may, for example, be provided with a reading head CIS3 at a position to form a staggered configuration with the reading head CIS1 and the reading head CIS2.

The head unit HD1 and the head unit HD2 each constitute a reading unit, a so-called scanner. Accordingly, the head unit HD1 and the head unit HD2 each read an image or the like formed on the surface of the web W, and output image data indicating the read image or the like. When the transfer apparatus 1 joins the image data output from respective head units, images connected in the direction Y orthogonal to the transfer direction X may be generated.

Note that in FIG. 24, an illustration is given of an example in which the support rollers R1 and R2 are not provided between the respective head units in the transfer apparatus 1; however, the number of support rollers provided between the adjacent head units is not limited to one, and as illustrated in FIG. 25, two or more support rollers may be provided between the adjacent rollers.

FIG. 25 is a schematic side diagram illustrating another example of the reading apparatus of FIG. 24. As in the first embodiment illustrated in FIG. 3, two pairs of nip rollers NR1, NR2, rollers 230, and the like are disposed as transfer drive units at opposite ends of a set of the support rollers CR1 to CR4 aligned substantially in parallel in the transfer direction X, where the support rollers CR1 and CR2 interpose the head unit HD2 and the support rollers CR3 and CR4 interpose the head unit HD1. One of the rollers of the pair of rollers of at least one nip roller (NR1 in FIG. 3) of the two pairs of rollers is a drive roller, and a driving force is given by the motor M1.

Further, the transfer apparatus 1 has a controller CT1 and an actuator controller CT2.

The controller CT1 and the actuator controller CT2 are information processing apparatuses. Specifically, the controller CT1 and the actuator controller CT2 have a hardware configuration including a CPU, an electronic circuit, or an arithmetic device such as a combination of these devices, a control device, a storage device, an interface, and the like. The controller CT1 and the actuator controller CT2 may each be multiple devices.

Note that the installation positions of the sensor devices SE1 and SE2 are preferably arranged in the same manner as in FIG. 3.

That is, in FIG. 24, a distance between the upstream surface detection sensor device SE0 and the edge sensor ES0 in the transfer direction is also shorter than the distance between the surface detection sensor device SE1 and the edge sensor ES0. In addition, the edge sensor ES0 is preferably disposed at a position aligned with the upstream sensor device SE0 in the orthogonal direction.

Head Unit Processing Position Example

FIG. 26 is a schematic diagram illustrating a head unit process position according to an embodiment of the present invention. For example, the reading head CIS1 of the head unit HD1 and the reading head CIS2 of the head unit HD2 are installed so as to have the positional relationship illustrated in FIG. 26. Further, each of the reading heads CIS1 and CIS2 has multiple CIS elements disposed in a line and has multiple reading regions Rs in association with respective CIS elements.

Specifically, the reading head CIS1 of the head unit HD1 reads a reading range SC1 in the orthogonal direction Y to generate read image data. The reading head CIS2 of the head unit HD2 reads a reading range SC2 in the orthogonal direction Y to generate read image data. As illustrated in FIG. 26, the reading range SC1 and the reading range SC2 partially overlap. Hereinafter, the range where the reading range SC1 and the reading range SC2 overlap is referred to as "overlapping range SC3".

Accordingly, in the overlapping range SC3, the head unit HD1 and the head unit HD2 may read the same object. That is, since the object read by the head unit HD1 in the overlapping range SC3 is transferred from the upstream side to the downstream side, the head unit HD2 may be enabled to read the same subject after a predetermined time. Note that since the interval between the head unit HD1 and the head unit HD2 may be obtained in advance, the transfer apparatus 1 may be enabled to calculate a timing at which the head unit HD2 reads the object that has been read by the head unit HD1 based on the moving speed.

Then, the transfer apparatus 1 stores the respective pieces of the read image data generated by the head unit HD1 and the head unit HD2 in the storage device. Next, the transfer apparatus 1 joins the respective pieces of the image data based on pixels of respective pieces of image data indicating the overlapping range SC3. Accordingly, the transfer apparatus 1 may be enabled to generate image data indicating the reading range SC1 and the reading range SC2 by joining the respective pieces of the image data. Note that the joining of the respective pieces of the image data may also be performed in the transfer direction.

As described above, by setting respective head units at different positions and joining the respective pieces of image data, the transfer apparatus 1 may be enabled to generate a read image illustrating a wide range seamlessly.

Functional Configuration Example

FIG. 27 is a functional block diagram illustrating a functional configuration example of a transfer apparatus according to an embodiment of the present invention. As illustrated in FIG. 27, in addition to the configuration illustrated in FIG. 25, the transfer apparatus includes a controller 1F3. In addition, it is preferable that the transfer apparatus further includes an image processor 1F5 configured to process the read image data.

The controller 1F3 performs a control procedure for controlling the head unit HD1 and the head unit HD2. For example, as illustrated in FIG. 27, the controller 1F3 preferably has a functional configuration including a moving controller 1F31 and a process timing controller 1F32.

The moving controller 1F31 controls the actuators AC1 and AC2 based on the misalignment amount calculated by the calculator 1F2. For example, the moving controller 1F31 is implemented by the actuator controller CT2 (FIG. 25) or the like.

The process timing controller 1F32 controls a reading process timing of the reading heads CIS1 and CI2 within the head units HD1 and HD2, respectively, based on the misalignment amount calculated by the calculator 1F2.

More specifically, when the misalignment amount in the transfer direction X is "Δx" and the moving speed of the web W is "V", the transfer apparatus changes the process timing in order to compensate for "Δx". In this example, the transfer apparatus changes the process timing by the downstream reading head to "ΔT=Δx/V".

That is, when the web W is transferred by being shifted by "Δx" with a delay, the transfer apparatus changes the process timing to be performed by the reading head CIS2 so as to be delayed by "ΔT". In this way, the transfer apparatus may be enabled to perform a process with high accuracy in the transfer direction X.

When the misalignment amount in the orthogonal direction Y is "Δy", the transfer apparatus moves the head unit in order to compensate for "Δy". The transfer apparatus 1 drives and controls the actuators AC1 and AC2 to move the respective reading heads CIS1 and CIS2 disposed in the head units HD1 and HD2 in the orthogonal direction Y. Thus, it is possible to move the reading positions at which the reading heads CIS1 and CIS2 perform reading.

In this way, the transfer apparatus may perform an image reading process for reading image data (test chart or the like) with high accuracy in a direction orthogonal to the transfer direction. In particular, when the head unit is moved to compensate for the misalignment amount during a process performed by the head unit, the transfer apparatus may be enabled to cause the head unit to perform a process with high accuracy.

Further, according to the third embodiment, as illustrated in FIG. 24, the upstream sensor device SE0 configured to output the most upstream surface information and the edge sensor ES0 are arranged at the same position in the width direction, which is a direction orthogonal (orthogonal direction) to the transfer direction. Thus, it is possible to detect the misalignment amount of the detection position of the speckle pattern at the position of the upstream sensor device SE0 with respect to the reference position.

Thus, it is possible to compensate for absolute positional misalignment with respect to amount of change (meandering amount), which is calculated by the head unit HD1 directly using the upstream sensor device SE0, or which is calculated by the head unit HD2 indirectly using the upstream sensor device SE0.

In this embodiment, as illustrated in FIGS. 15 and 16, at the time of inspection, reading of a test chart may be performed by reading the edge misalignment at the initial adjustment and then correcting the image reading position. In this case, the edge misalignment of the sheet is calculated only at the initial adjustment. Thus, when reading the read image data while transferring the web W, only the sheet meandering amount needs to be calculated. Accordingly, it is possible to read a high-quality image while reducing the load on the controller.

Alternatively, as illustrated in FIGS. 17 and 18, the edge misalignment may be detected in real time and reflected on the correction of the reading position.

When the edge misalignment is detected in real time, the sheet edge misalignment amount may be calculated by obtaining a mean (average) of the latest acquired data by a moving average, or by excluding acquired data with noise using a filter. Calculating the data in this manner makes it possible to avoid an adverse effect of sheet edge chipping and noise at the timing of sensors' sampling data during reading. Thus, the accurate image reading position may be obtained.

The position of the scanner is adjusted at a predetermined period during image reading by detecting the edge misalignment in real time; hence, it is possible to read a higher quality image even when edge misalignment occurs on the sheet during transferring of the sheet.

In the third embodiment, an illustration is given of an example of the apparatus configured as a single unit; however, an inspection apparatus which is a reading apparatus may be provided as one of the devices of the image forming system illustrated in FIG. 20.

For example, the reading apparatus according to the third embodiment may be arranged at a subsequent stage of the image forming apparatus illustrated in FIGS. 2 and 3 to read a test chart, which is an image used for inspection to adjust landing position on the sheet.

In this case, as image inspection, the head units HD1 and HD2, which are the readers of an inspection apparatus, capture and read a test pattern such as a gradation pattern whose density is adjusted, as an inspection image for landing position correction.

The reading apparatus for reading according to the third embodiment further includes a control mechanism (reading result processor, and a recording head landing position setting unit, etc.) in addition to a mechanism for reading color information of an image of a scanner or the like constituting a head unit.

Further, in this example, the image forming apparatus described in the first embodiment and the reading apparatus (inspection apparatus) described in the third embodiment may be provided in one image forming system. This configuration enables inspection of a landing position with higher accuracy to achieve high quality image formation reflecting the inspection result.

In addition, in the above example, the image forming apparatus in the form of directly transferring by ink jet has been described in the first embodiment and the second embodiment. However, the transfer apparatus of the present invention is also applicable to an intermediate transfer type image forming apparatus.

Fourth Embodiment: Intermediate Transfer Type

FIG. 28 is a schematic diagram illustrating an internal configuration of an intermediate transfer type inkjet image forming apparatus 500.

In this configuration, the head units 51C, 51M, 51Y and 51K eject ink droplets to form an image on an outer peripheral surface of the transfer belt 520. The head units 51C, 51M, 51Y and 55K are collectively referred to as a head unit group 51. The head units 51C, 51M, 51Y and 51K function as image forming units. Then, a drying mechanism 570 dries the image formed on the transfer belt 520 to form a film.

At a transfer unit where the transfer belt 520 faces a transfer roller 530, the filmized image on the transfer belt 520 is transferred to a web W.

A cleaning roller 523 cleans the surface of the transfer belt 520 after the transfer of the filmized image.

In the image forming apparatus 500 illustrated in FIG. 28, the head units 51C, 51M, 51Y and 51K, the drying mechanism 57, the cleaning roller 523, and the transfer roller 530 are disposed on the outside of the transfer belt 520.

In this configuration, the transfer belt 520 is looped over a driving roller 521, an opposing roller 522, four shape maintaining rollers 524, and eight support rollers 525C1, 525C2, 525M1, 525M2, 525Y1, 525Y2, 525K1, and 525K2 such that the transfer belt 520 moves in a direction indicated by arrows in FIG. 28 following the driving roller 521 which is rotated by a transfer belt drive motor 527. The direction in which the transfer belt 520 moves by rotation of the driving roller 521 is defined as a moving direction.

The eight support rollers 525C1, 525C2, 525M1, 525M2, 525Y1, 525Y2, 525K1, and 525K2 provided to face the head unit group 51 maintain tension of the transfer belt 520 when ink droplets are ejected from the head units 51. The transfer motor 531 rotationally drives the transfer roller 530. In the present configuration, a sensor device 55C is disposed between the support roller 525C1 and the support roller 525C2 and at an upstream position from the ejection position of the head unit 51C in the moving direction of the transfer belt 520. The sensor device 55C has a speckle sensor. The speckle sensor is an example of a sensor configured to image the surface of the transfer belt 520.

A sensor device 55M is disposed with respect to the head unit 51M, a sensor device 55Y is disposed with respect to the head unit 51Y, and a sensor device 55K is disposed with respect to the head unit 51K in accordance with a positional relationship similar to the positional relationship between the support roller 525C1, the support roller 525C2 and the sensor device 55C with respect to the head unit 51C.

In the fourth embodiment, the support rollers 525C1, 525M1, 525Y1 and 525K1 are first support members disposed upstream of the process positions of the head units of respective colors, and the support rollers 525C2, 525M2, 525Y2, 525K2 are second support members disposed downstream of the process positions of the head units.

Further, in this configuration, an edge sensor 56 configured to detect an edge in a width direction of the transfer belt 520 is provided. Note that according to the configuration of the fourth embodiment, there is no sensor device that is not associated with the head unit 51 and a sensor device 55C provided at the most upstream position in the transfer direction of the transfer belt 520 functions as an upstream surface detection sensor. However, the configuration of the fourth embodiment is not limited to this example. A sensor device not associated with the head unit 51 may be provided, and such another sensor device provided at the most upstream position in the transfer direction of the transfer belt 520 may function as the upstream surface detection sensor. In addition, the sensor devices 55M, 55Y, and 55K function as surface detection sensors.

In FIG. 28, a distance between the upstream surface detection sensor device (sensor device 55C) and the edge sensor 56 in the transfer direction is shorter than the distance between the sensor device 55M and the edge sensor 56. Furthermore, although the components in FIG. 28 are illustrated as being shifted for visualization in FIG. 28, it is preferable that the edge sensor 56 be arranged at a position aligned with the sensor device 55C in the orthogonal direction.

According to the fourth embodiment, the sensor devices 55C, 55M, 55Y and 55K detect the surface of the transfer belt 520, which is an object to be transferred that faces the head units. For example, a rear surface of the transfer belt 520 according to the fourth embodiment is provided with an uneven pattern (speckle pattern) unique to a position of the irradiation surface of the transfer belt 520 generated by irradiation of light, and the sensor devices 55C, 55M, 55Y and 55K image the uneven pattern to detect the surface information.

In this configuration, actuators 511M, 511Y, and 511K are respectively provided in the head unit 51M, the head unit 51Y, and the head unit 51K. The actuator 511M is an actuator configured to move the head unit 51M in a direction orthogonal to the moving direction of the transfer belt 520. Similarly, the actuators 511Y and 511K are configured to move the head unit 51Y and the head unit 51K, respectively, in a direction orthogonal to the moving direction of the transfer belt 520.

A control board 54 is configured to detect the moving amount of the transfer belt 520 in the orthogonal direction and the moving amount of the transfer belt 520 in the moving direction, based on the image data acquired from the sensor devices 55C, 55M, 55Y and 55K, and the edge detection position of the edge sensor 56.

In addition, the control board 54 controls the actuators 511M, 511Y and 511K according to the moving amount of the transfer belt 520 in the orthogonal direction to move the head units 51M, 51Y and 51K in the orthogonal direction. Further, the control board 54 controls ejection timings of the head units 51M, 51Y and 51K according to the moving amount of the transfer belt 520 in the moving direction. Further, the control board 54 outputs drive signals to the transfer belt drive motor 527 and the transfer motor 531.

According to the above-described configuration of the fourth embodiment, even when the transfer belt 520 moves in a direction orthogonal to the moving direction of the driving roller 521 driven by the driving roller 521 during the movement of the transfer belt 520, the head units 51M, 51Y and 51K may be moved in the orthogonal direction in accordance with the detected moving amount. Accordingly, it is possible to form a high-quality image on the transfer belt 520.

Further, when the transfer belt 520 moves in a moving direction driven by the driving roller 521 by a moving amount different from the expected moving amount, the ejection timings of the head units 51M, 51Y and 51K may change in accordance with the detected moving amount. Accordingly, it is possible to form a high-quality image on the transfer belt 520.

In the above example, based on the image data acquired from the sensor devices 55C, 55M, 55Y and 55K, and the detection results detected by the edge sensor 56, the moving amount of the transfer belt 520 in the orthogonal direction and the moving amount of the transfer belt 520 in the moving direction are calculated; however, only one of the moving amount of the transfer belt 520 in the orthogonal direction and the moving amount of the transfer belt 520 in the moving direction may be calculated when only a corresponding one of the moving amounts is used.

In addition, in this configuration, the head unit 51C does not have an actuator; however, the head unit 51C may have an actuator. By moving the head unit 51C in the orthogonal direction, it is possible to control the position in the direction orthogonal to the transfer direction of the transfer web W at the time of transferring an image from the transfer belt 520 to the web W.

In the above example, an image is formed on the transfer belt 520 by using four head units; however, an image may be formed on the transfer belt 520 by using at least two head units.

Further, in this example, the image forming apparatus described in the first embodiment and the reading apparatus (inspection apparatus) described in the third embodiment are provided in one image forming system. This configuration of the image forming system enables inspection of a landing position with higher accuracy to achieve high quality image formation reflecting the inspection result.

In the transfer apparatus (image forming apparatus, image reading apparatus), an object subject to image formation and subject to image reading is described as a sheet of paper; however, the recording medium as an object to be transferred is not limited to a sheet of paper. For example, a recording medium indicates a medium to which a liquid adheres at least temporarily, to which a liquid adheres, sticks, or adheres and permeates. Specific examples of the recording medium used in the embodiment may, unless otherwise specified, include all the media to which liquids and powders adhere. Specific examples include a recording medium such as a sheet, recording paper, a recording sheet, film, cloth and the like having an even pattern on a surface, which is detectable upon irradiation of light, or a medium such as an electronic part such as an electronic substrate and a piezoelectric element, a powder layer (powder layer), an organ model, an inspection cell and the like. For example, the material of the "object to be transferred" may be paper, thread, fiber, cloth, leather, metal, plastic, glass, wood, ceramics, and the like; the material of the "object to be transferred" may be a material to which a liquid adheres at least temporarily and having an even pattern on a surface, which is detectable upon irradiation of light.

The preferred embodiments of the present invention have been described in detail above; however, the present invention is not limited to a specific one of the embodiment s, and various modifications and alterations may be made within the scope described in the claims.

REFERENCE SIGNS LIST

1 "reading apparatus
(transfer apparatus, process apparatus)"
15A image storage unit
15B image storage unit
16A imaging unit (upstream imaging unit)
16B imaging unit
71 host apparatus
91 semiconductor laser light source (light emitter)
110 image forming apparatus (liquid ejection apparatus, transfer apparatus, process apparatus)
210K black liquid ejection head unit (head unit, droplet ejection unit)
210C cyan liquid ejection head unit (head unit, droplet ejection unit)
210M magenta liquid ejection head unit (head unit, droplet ejection unit)
210Y yellow liquid ejection head unit (head unit, droplet ejection unit)
300 controller (control unit)
310 meandering amount calculator
320 edge misalignment amount calculator
321 comparator
322 reference value storage unit
323 misalignment amount calculator
324 previous position storage unit
330 head unit correction amount calculator (head moving amount calculator)
331 adder
340 actuator drive instruction unit
350 ejection timing adjuster
360 sampling period setting unit
500 image forming apparatus
51C, 51M, 51Y, 51K head unit (image forming unit)
55C sensor device (upstream surface detector)
55M, 55Y, 55K sensor device (surface detector)
520 transfer belt (object to be conveyed)
CIS1, CIS2 reading head
CR1K, CR1C, CR1M, CR1Y support roller (first support member)
CR2K, CR2C, CR2M, CR2Y support roller (second support member)
ES0 edge sensor (edge detector)
HD1 head unit (reading head unit)
HD2 head unit (reading head unit)
R0 support member
R1 support roller (first support member of 210K)
R2 support roller (second support member of 210K, first support member of 210c)
R3 support roller (second support member of 210C, first support member of 210M)
R4 support roller (second support member of 210M, first support member of 210Y)
R5 support roller (second support member of 210Y)
SE0, SEN2 upstream sensor device, upstream surface detection sensor device (upstream surface detector)
SE1, SENK black sensor device, surface detection sensor device (surface detector)
SE2, SENC cyan sensor device, surface detection sensor device (surface detector)
SE3, SENM magenta sensor device, surface detection sensor device (surface detector)
SE4, SENY yellow sensor device, surface detection sensor device (surface detector)
W web (recording medium, continuous paper, sheet, object to be transferred)

The present application is based on and claims the benefit of priority of Japanese Priority Application No. 2017-117301 filed on Jun. 14, 2017, and Japanese Priority Application No. 2018-110541 filed on Jun. 8, 2018, the entire contents of which are hereby incorporated herein by reference.

The invention claimed is:

1. A transfer apparatus comprising:
a head unit configured to perform a process on an object to be transferred;
a first support member disposed upstream in a transfer direction of the object with respect to a process position at which the transferred object is processed by the head unit, and configured to support the transferred object;
a second support member disposed downstream in the transfer direction with respect to the process position, and configured to support the transferred object;
a surface detector disposed between the first support member and the second support member and configured to detect first surface information of the transferred object;
an upstream surface detector disposed upstream in the transfer direction with respect to the surface detector, and configured to detect second surface information of the transferred object;
an edge detector disposed at a position closer to the upstream surface detector than that to the surface detector in the transfer direction, and configured to detect an edge in a width direction of the transferred object; and
control circuitry configured to
calculate a meandering amount in the width direction of the transferred object between a position facing the upstream surface detector and a position facing the surface detector, based on respective detection results of the surface detector and the upstream surface detector;

calculate a misalignment amount of an edge from a preset reference position by comparing a position of the edge detected by the edge detector with the preset reference position;

calculate a moving amount for moving the head unit to a correction process position reflecting the calculated meandering amount and the calculated misalignment amount of the edge in the width direction of the transferred object; and move the head unit based on respective detection results of the surface detector and the upstream surface detector and a detection result of the edge detector.

2. The transfer apparatus according to claim 1, wherein the control circuitry is further configured to calculate the moving amount of the head unit using a misalignment amount of the edge of the transferred object at initial adjustment, and a meandering amount of the transferred object during transfer operation.

3. The transfer apparatus according to claim 1, wherein the control circuitry is further configured to calculate the moving amount of the head unit, using a misalignment amount of the edge of the transferred object during transfer operation and a meandering amount of the transferred object during transfer operation.

4. The transfer apparatus according to claim 3, wherein the control circuitry is further configured to calculate a misalignment amount of the edge of the transferred object during the transfer operation by obtaining a mean of misalignment amounts during the transfer operation using a moving average.

5. The transfer apparatus according to claim 1, wherein the surface detector and the upstream surface detector each include a light emitter configured to irradiate the object with light of a specific wavelength;

the upstream surface detector includes an upstream imaging unit configured to image a pattern generated by interference of the light applied to an even pattern formed on a surface or an inner surface of the object; and the surface detector includes an imaging unit configured to image a pattern generated by interference of the light applied to an even pattern formed on the surface or the inner surface of the object, wherein the control circuitry further calculates a meandering amount in a width direction of the transferred object between a position facing the upstream imaging unit and a position facing the imaging unit, based on the respective imaged patterns imaged by the upstream imaging unit and the imaging unit.

6. The transfer apparatus according to claim 1, wherein the edge detector is aligned with the upstream surface detector in a width direction that is a direction orthogonal to the transfer direction in which the object is transferred.

7. The transfer apparatus according to claim 1, wherein the object to be transferred is a long continuous sheet along the transfer direction.

8. The transfer apparatus according to claim 1, further comprising:

a plurality of head units aligned in parallel with one another in a direction along the transfer direction, the plurality of head units each having a configuration extending along a direction orthogonal to the transfer direction;

a plurality of first support members configured to support the transferred object, the plurality of first support members being positioned upstream of respective process positions of the plurality of head units in the transfer direction; and a plurality of surface detectors disposed along the transfer direction in association with the plurality of head units, respectively, wherein the control circuitry is further configured to move each of the plurality of head units based on at least two detection results, among detection results obtained by the plurality of surface detectors and the upstream surface detector, and a detection result of the edge detector.

9. A liquid ejection apparatus comprising:

the head unit included in the transfer apparatus according to claim 1, wherein the head unit is a liquid ejection unit configured to eject liquid droplets to form an image.

10. A reading apparatus comprising:

the head unit included in the transfer apparatus according to claim 1, wherein the head unit is a reading unit configured to read a test pattern formed on the object to be transferred.

11. The transfer apparatus according to claim 1, further comprising:

a plurality of head units aligned in parallel with one another in a direction along the transfer direction, the plurality of head units each having a configuration extending along a direction orthogonal to the transfer direction; and a plurality of surface detectors disposed along the transfer direction in association with the plurality of head units, respectively, wherein the control circuitry is further configured to move each of the plurality of head units excluding the most upstream head unit from among the plurality of head units, based on at least two detection results, among detection results obtained by the plurality of surface detectors and the upstream surface detector, and a detection result of the edge detector.

12. The transfer apparatus according to claim 11, wherein the object to be transferred is a transfer belt configured to be transferred along the transfer direction.

13. An image forming apparatus comprising:

the plurality of head units in the transfer apparatus according to claim 12, wherein each of the plurality of head units is an image forming unit configured to transfer a transfer pattern onto the transfer belt, and the transfer pattern transferred to the transfer belt is further transferred onto a recording medium.

14. A method for controlling a transfer apparatus, the transfer apparatus including a head unit and being configured to transfer an object in a transfer direction while performing a process on the transferred object using the head unit, the method comprising:

detecting, by an upstream surface detector, first surface information of the transferred object, the upstream surface detector being disposed upstream in the transfer direction with respect to the head unit;

detecting, by an edge detector, an edge in a width direction of the transferred object;

detecting, by a surface detector, second surface information of the transferred object, the surface detector being disposed downstream with respect to the upstream surface detector and the edge detector in the transfer direction, and disposed at a position having a distance from the upstream surface detector longer than a distance between the upstream surface detector and the edge detector in the transfer direction;

calculating a meandering amount in the width direction of the transferred object between a position facing the upstream surface detector and a position facing the surface detector, based on respective detection results of the surface detector and the upstream surface detector;

calculating a misalignment amount of the edge from a preset reference position by comparing a position of the edge in the width direction detected by the edge detector with the preset reference position; and calculating a moving amount for moving the head unit to a correction process position reflecting the calculated meandering amount and the calculated misalignment amount of the edge in the width direction of the transferred object; and moving the head unit by the calculated movement amount.

15. A transfer apparatus comprising:

a head unit configured to perform a process on an object to be transferred;

a first support member disposed upstream in a transfer direction of the object with respect to a process position at which the transferred object is processed by the head unit, and configured to support the transferred object;

a second support member disposed downstream in the transfer direction with respect to the process position, and configured to support the transferred object;

a surface detector disposed between the first support member and the second support member and configured to detect first surface information of the transferred object;

an upstream surface detector disposed upstream in the transfer direction with respect to the surface detector, and configured to detect second surface information of the transferred object;

an edge detector disposed at a position closer to the upstream surface detector than that to the surface detector in the transfer direction, and configured to detect an edge in a width direction of the transferred object; and control circuitry configured to move the head unit based on respective detection results of the surface detector and the upstream surface detector and a detection result of the edge detector, wherein the surface detector and the upstream surface detector each include a light emitter configured to irradiate the object with light of a specific wavelength, the upstream surface detector includes an upstream imaging unit configured to image a pattern generated by interference of the light applied to an even pattern formed on a surface or an inner surface of the object, the surface detector includes an imaging unit configured to image a pattern generated by interference of the light applied to an even pattern formed on the surface or the inner surface of the object, and the meandering amount calculator calculates a meandering amount in a width direction of the transferred object between a position facing the upstream imaging unit and a position facing the imaging unit, based on the respective imaged patterns imaged by the upstream imaging unit and the imaging unit.

16. A liquid ejection apparatus comprising:

the head unit included in the transfer apparatus according to claim 15, wherein the head unit is a liquid ejection unit configured to eject liquid droplets to form an image.

17. A reading apparatus comprising:

the head unit included in the transfer apparatus according to claim 15, wherein the head unit is a reading unit configured to read a test pattern formed on the object to be transferred.

* * * * *